(12) United States Patent
Oh et al.

(10) Patent No.: US 10,542,375 B2
(45) Date of Patent: Jan. 21, 2020

(54) SYSTEM AND METHOD FOR TRANSMITTING INFORMATION ABOUT TASK TO EXTERNAL DEVICE

(71) Applicant: Samsung Electronics Co., Ltd., Suwon-si, Gyeonggi-do (KR)

(72) Inventors: Hyung-rai Oh, Yongin-si (KR); Ho-jung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 15/706,050

(22) Filed: Sep. 15, 2017

(65) Prior Publication Data

US 2018/0007510 A1 Jan. 4, 2018

Related U.S. Application Data

(63) Continuation of application No. 14/982,424, filed on Dec. 29, 2015, now Pat. No. 9,769,608.

(30) Foreign Application Priority Data

Jan. 5, 2015 (KR) .................. 10-2015-0000860

(51) Int. Cl.
*H04B 7/00* (2006.01)
*H04W 4/02* (2018.01)
*H04L 29/08* (2006.01)
*H04B 1/3827* (2015.01)
*H04W 84/18* (2009.01)
*H04M 1/725* (2006.01)
*H04L 29/06* (2006.01)

(52) U.S. Cl.
CPC .......... *H04W 4/023* (2013.01); *H04L 67/148* (2013.01); *H04L 67/2814* (2013.01); *H04B 1/385* (2013.01); *H04B 2001/3855* (2013.01); *H04B 2001/3861* (2013.01); *H04L 65/1083* (2013.01); *H04M 1/7253* (2013.01); *H04W 84/18* (2013.01)

(58) Field of Classification Search
CPC ..... H04W 4/023; H04W 4/008; H04W 84/18; H04B 1/385
USPC ........................................ 455/41.3
See application file for complete search history.

(56) References Cited

U.S. PATENT DOCUMENTS 8,803,690 B2 * 8/2014 Junqua .................. G08B 5/22
340/573.1
9,674,640 B2 * 6/2017 Mannan .................. H04W 4/70
(Continued)

FOREIGN PATENT DOCUMENTS

KR 10-1373368 B1 3/2014
KR 10-1395529 B1 5/2014
KR 10-2014-0083861 A 7/2014

*Primary Examiner* — April G Gonzales
(74) *Attorney, Agent, or Firm* — Jefferson IP Law, LLP

(57) ABSTRACT

A method and a system for an external device with information about a task being performed by a user device are provided. The method includes receiving information about the task being performed by the user device, identifying a plurality of external devices located near a wearable device of a user of the user device, determining a first external device to continuously perform the task from among the plurality of external devices based on the information about the task and characteristics information about the identified external devices, and transmitting the information about the task to the first external device.

20 Claims, 17 Drawing Sheets

(56) References Cited

U.S. PATENT DOCUMENTS

| | | | |
|---|---|---|---|
| 2010/0099359 A1* | 4/2010 | Lee | H04L 65/80 455/41.3 |
| 2011/0091848 A1* | 4/2011 | Cooksy | G06Q 10/06 434/238 |
| 2012/0289213 A1* | 11/2012 | Levien | H04W 4/16 455/417 |
| 2013/0016935 A1* | 1/2013 | Cooley | E21B 4/003 384/420 |
| 2013/0046935 A1 | 2/2013 | Ramanathan | |
| 2013/0297704 A1* | 11/2013 | Alberth, Jr. | H04L 67/303 709/205 |
| 2014/0045484 A1* | 2/2014 | Kim | H04W 8/24 455/420 |
| 2014/0173690 A1* | 6/2014 | Ekberg | H04L 63/08 726/3 |
| 2014/0175028 A1* | 6/2014 | Wolf | B04C 11/00 210/787 |
| 2014/0178028 A1 | 6/2014 | Park et al. | |
| 2014/0189527 A1* | 7/2014 | Kruglick | G06F 9/451 715/746 |
| 2014/0201319 A1* | 7/2014 | Mannan | H04W 4/70 709/217 |
| 2014/0282015 A1* | 9/2014 | Nixon | G05B 11/01 715/733 |
| 2015/0012610 A9* | 1/2015 | Mannan | H04W 4/70 709/217 |
| 2015/0081837 A1* | 3/2015 | Bernier | H04W 8/24 709/217 |

\* cited by examiner

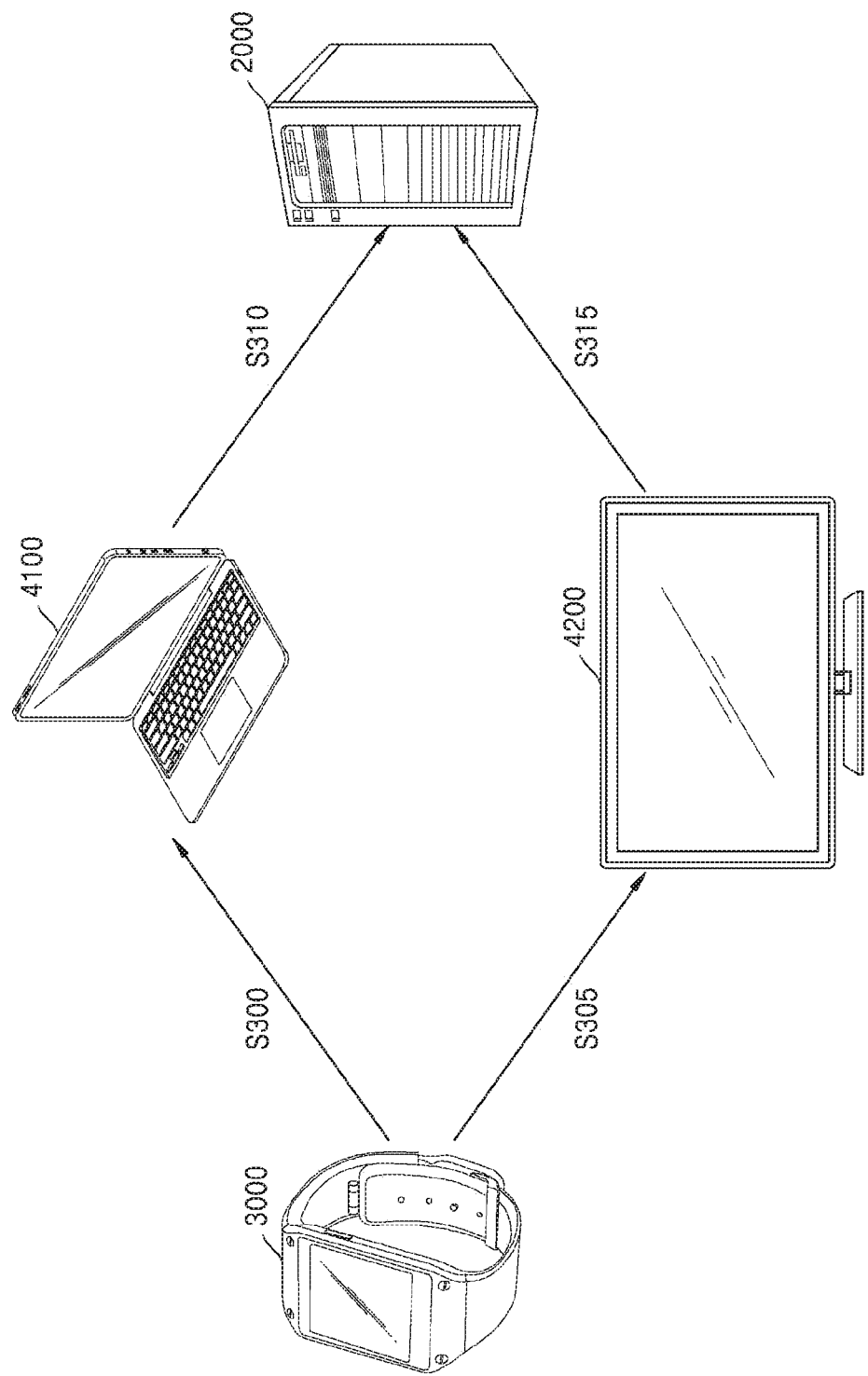

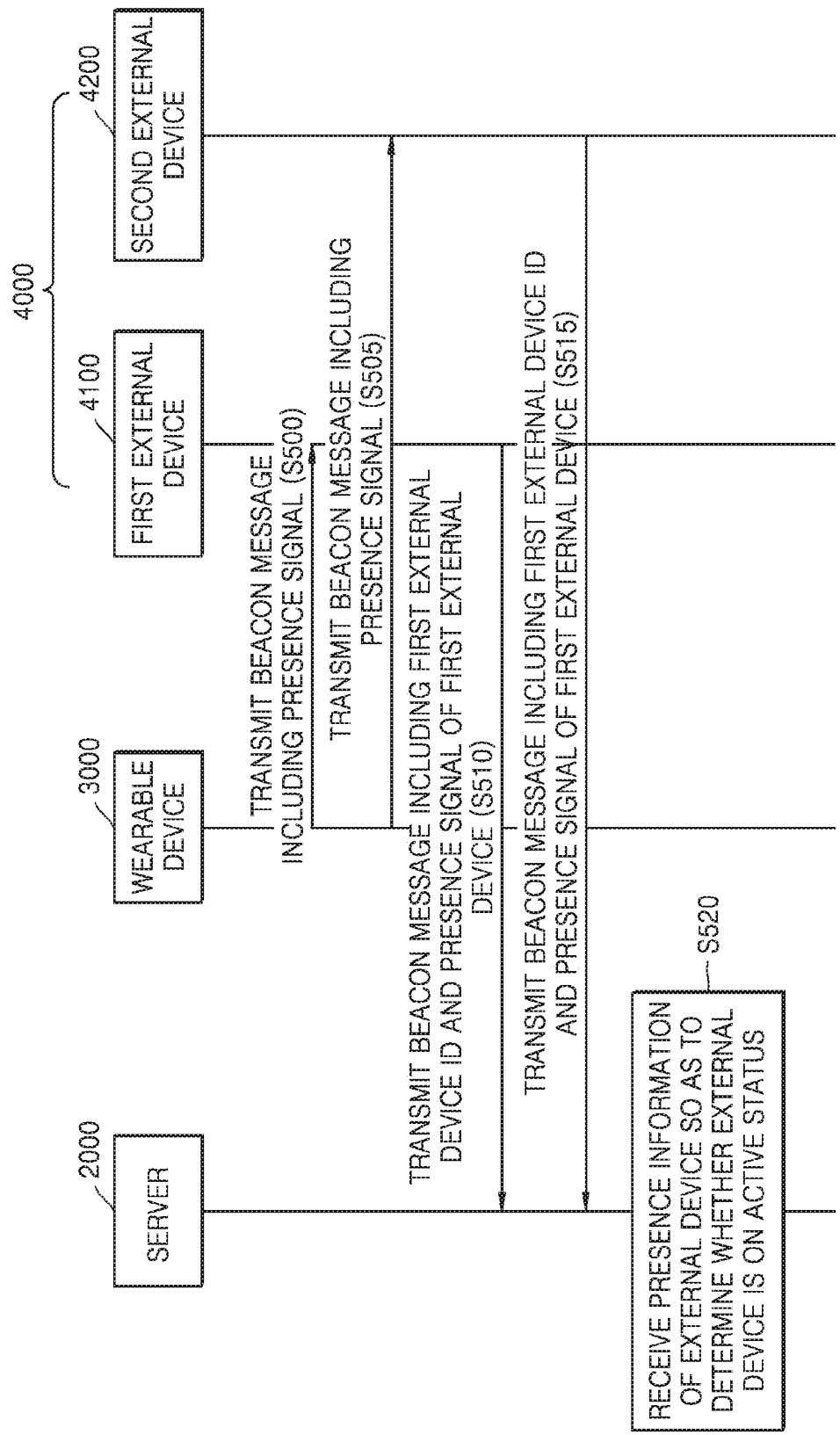

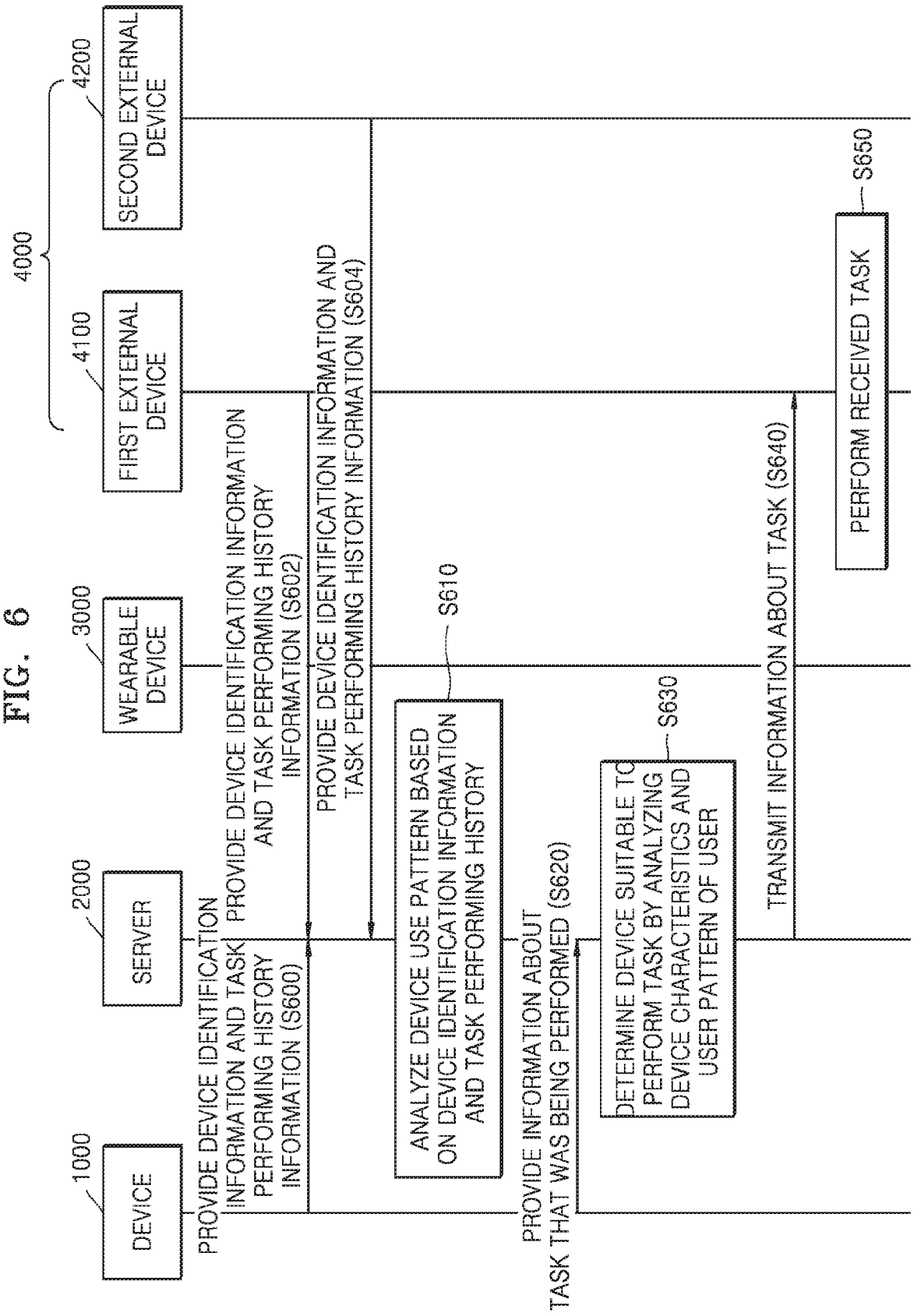

FIG. 7

| DEVICE ID 700 | TYPE OF TASK 710 | App. 720 | CAPACITY 730 | RESOLUTION 740 | RUNNING TIME 750 | URL 760 | INPUT DEVICE 770 | IS AUTHENTICATION INFORMATION INCLUDED? 780 |
|---|---|---|---|---|---|---|---|---|
| TV | Movie | - | 3.5GB | 1920X1080 | 1:08:25 | www.xxx.com | REMOTE CONTROLLER | Y |
| Laptop | EMAIL WRITING | Outlook | 500KB | 1024X768 | 1page 15line | www.aaa.com | KEYBOARD | Y |
| | DOCUMENT DRAFTING | Word program | 1.5MB | 1024X768 | 24page 11line | www.bbb.com | KEYBOARD, MOUSE | Y |
| Tablet PC | GAME | Angry bird | 25MB | 1280X720 | level5 | www.xyz.com | TOUCH INPUT | Y |

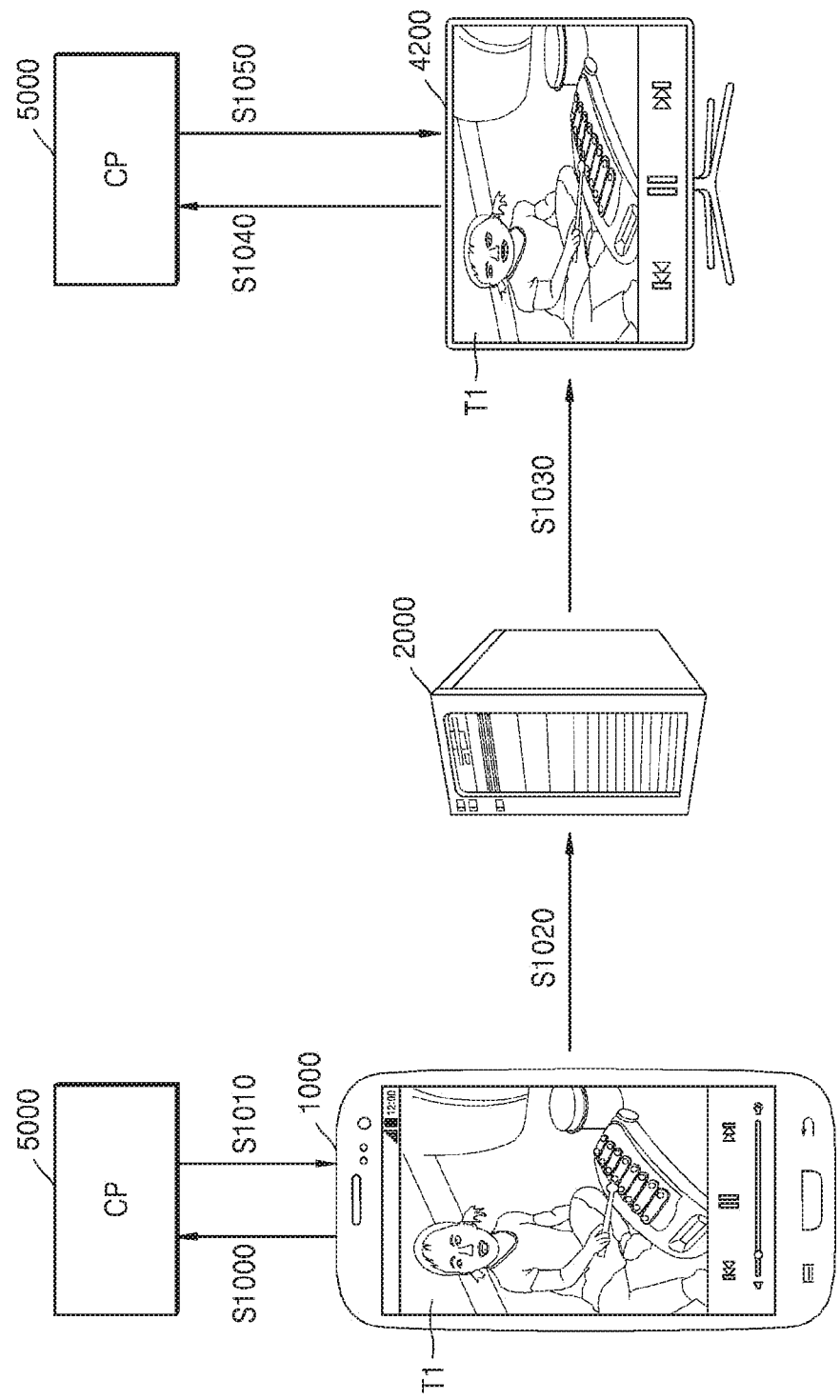

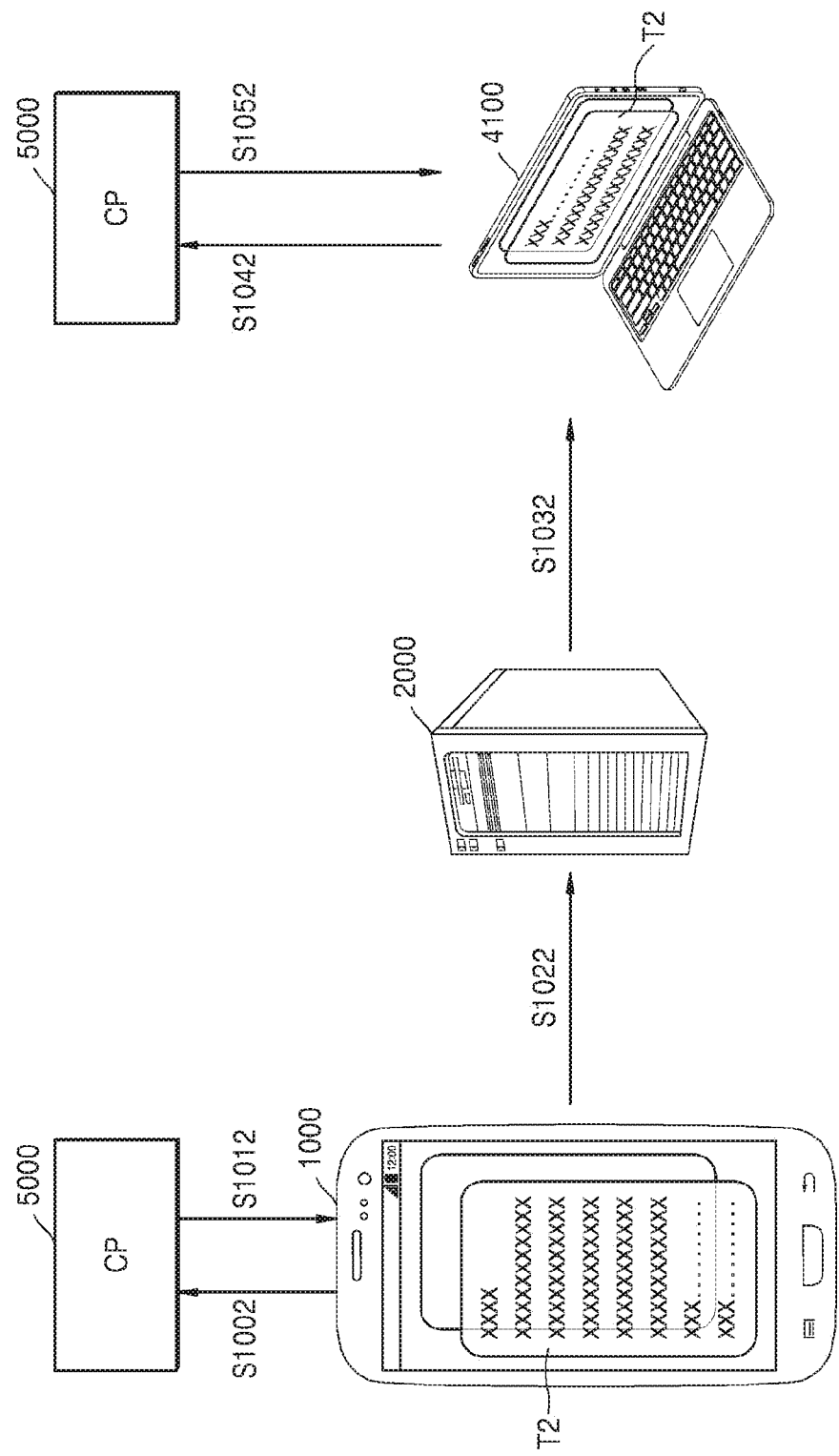

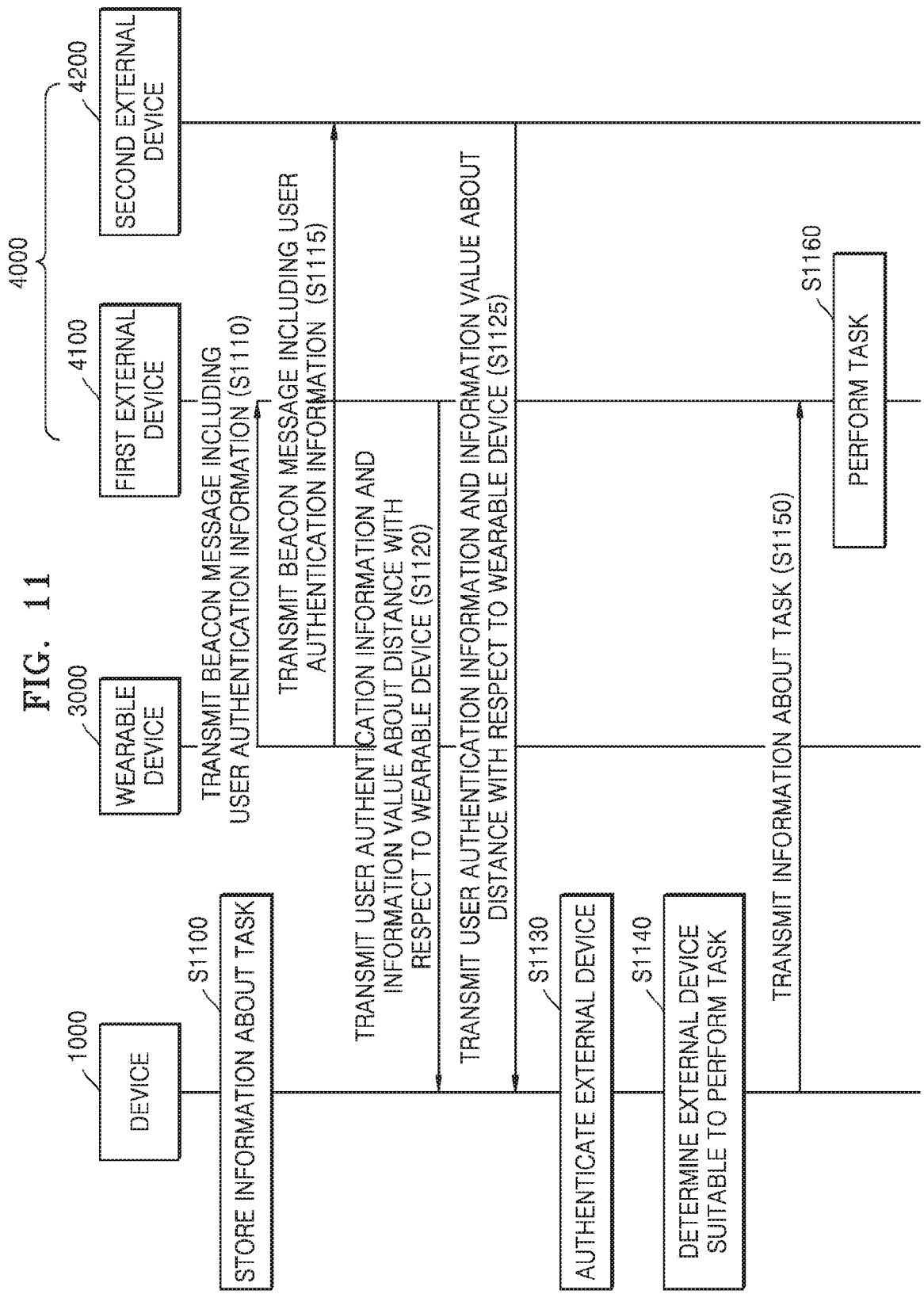

SYSTEM AND METHOD FOR TRANSMITTING INFORMATION ABOUT TASK TO EXTERNAL DEVICE

CROSS-REFERENCE TO RELATED APPLICATION(S)

This application is a continuation application of prior application Ser. No. 14/982,424, filed on Dec. 29, 2015 and claimed the benefit under 35 U.S.C. § 119(a) of a Korean patent application filed on Jan. 5, 2015 in the Korean Intellectual Property Office and assigned Ser. No. 10-2015-0000860, the entire disclosure of each of which is hereby incorporated by reference.

TECHNICAL FIELD

The present disclosure relates to a method of providing an external device with information about a task that is being performed by using a device and a system including the device and the external device.

BACKGROUND

Due to improvement in performance of devices and peripheral devices, various functions may be provided by using the devices and the peripheral devices. In addition, as communication technology is developed, a device can be connected to other external devices using various wireless communication methods. However, as devices and also tasks performed by using the devices become more diversified, it is difficult to perform various tasks being performed by each of the devices comprehensively and also, tasks are sometimes synchronized by a network such as a cloud without considering characteristics of devices. Thus, a user needs to predict what task is to be performed by using which device and synchronize tasks with respective devices in advance to thereby continuously perform the tasks.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods of receiving information about a task being performed by using a device and providing an external device with information about the task, wherein the methods are performed by using a server.

Another aspect of the present disclosure is to provide systems including a device performing a task, a plurality of external devices located near the device, and a server receiving information about the task and providing an external device determined to be suitable to perform the task, with the information about the task.

Additional aspects will be set forth in part in the description which follows and, in part, will be apparent from the description, or may be learned by practice of the presented various embodiments.

In accordance with an aspect of the present disclosure, a method of providing an external device with information about a task being performed by a user device, wherein the method is performed by using a server is provided. The method includes receiving, by the server, information about the task being performed by the user device, identifying a plurality of external devices located near a wearable device of a user of the user device, determining a first external device to continuously perform the task from among the plurality of external devices based on the information about the task and characteristics information about the identified external devices, and transmitting the information about the task to the first external device.

The identifying of the plurality of external devices may include identifying a plurality of external devices located near the wearable device by receiving information about distances between the wearable device and the plurality of external devices, the information about distances being received from the plurality of external devices that have received a short range wireless communication signal from the wearable device.

The information about the distances between the wearable device and the plurality of external devices may be received from the plurality of external devices via a wireless communication signal that is different from the short range wireless communication signal.

The information about the distances between the wearable device and the plurality of external devices may be obtained based on short range wireless communication signals transmitted by the plurality of external devices and received by the wearable device, wherein a distance is calculable from each short range wireless communication signal.

The information about the distances between the wearable device and the plurality of external devices may include device identification information of each of the plurality of external devices.

The information about the distances between the wearable device and the plurality of external devices may include information indicating whether each of the plurality of external devices is on an active status for receiving the information about the task and for performing a function related to the task.

The short range wireless communication signal may include authentication information for identifying the user.

The information about the task performed by the user device may include information about a type of a task performed by using the user of the device and history information about an external device that performs the task.

The determining of the first external device may be performed by analyzing a pattern for performing the task of the user based on the type of the task and at least one of the history information of the external device that performed, is currently performing, or is scheduled to perform, the task.

The method may further include continuously performing the task included in the information about the task by using the first external device.

The continuous performing of the task may include transmitting user authentication information used to receive content related to the task from a content providing server to the first external device, receiving the content from the content providing server by using the user authentication information, and executing the content.

In accordance with another aspect of the present disclosure, a system for transmitting information about a task being performed, between different devices is provided. The system includes a device configured to perform a task, a plurality of external devices located near a user who is using the device, and a server configured to receive information about the task being performed by using the device and transmit the information about the task to one of the plurality of external devices, wherein the server determines one of the plurality of external devices as a first external device to continuously perform the task based on the information about the task and characteristics information of each of the plurality of external devices.

The system may further include a wearable device worn and used by the user, wherein the wearable device identifies the plurality of external devices located near the wearable device.

The wearable device may transmit a short range wireless communication signal to the plurality of external devices located near the wearable device.

The plurality of external devices may receive a short range wireless communication signal from the wearable device, and calculate distances between the wearable device and the plurality of external devices and transmit information about the distances to the server.

The server may include a controller configured to determine the first external device by analyzing a task performing pattern of the user based on the type of the task and history information about an external device that performed the task.

The first external device continuously may perform the task according to the received information about the task.

In accordance with another aspect of the present disclosure, a method of providing an external device with information about a task being performed by using a device is provided. The method includes storing information about the task being performed by using the device, identifying a plurality of external devices located near the device, determining a first external device suitable to continuously perform the task from among the identified plurality of external devices based on the information about the task and characteristics of the identified external devices, and transmitting the information about the task to the first external device.

In accordance to another aspect of the present disclosure, a non-transitory computer readable recording medium having embodied thereon a program for executing on a computer the method described above is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 illustrates an example in which a wearable device transmits a wireless signal to a plurality of external devices, and the plurality of external devices that have received the wireless signal transmit information about distances between the wearable device and the plurality of external devices to a server according to an embodiment of the present disclosure;

FIG. 5 is a flowchart of a method of transmitting, performed by using a wearable device, a signal indicating whether an external device located near the wearable device is activated, to the external device, and a method of providing, performed by using the external device, a server with the information according to an embodiment of the present disclosure;

FIG. 6 is a flowchart of a method of receiving, performed by using a server, device information and information about a task performing history from a device and determining, performed by using the server, a device suitable to perform the task from among external devices based on the device information and the task history information according to an embodiment of the present disclosure;

FIG. 7 illustrates an example of information about a task according to an embodiment of the present disclosure;

FIG. 10A illustrates an example where a moving picture that was being provided by using a device by using a content providing server, is continuously provided by using a first external device according to an embodiment of the present disclosure;

FIG. 10B illustrates an example where an email that was being written by using a device by using a content providing server, is continuously written by using a second external device according to an embodiment of the present disclosure;

FIG. 11 is a flowchart of a method of providing an external device with information about a task performed by using a device according to an embodiment of the present disclosure;

Throughout the drawings, like reference numerals will be understood to refer to like parts, components, and structures.

DETAILED DESCRIPTION

Figure 1:
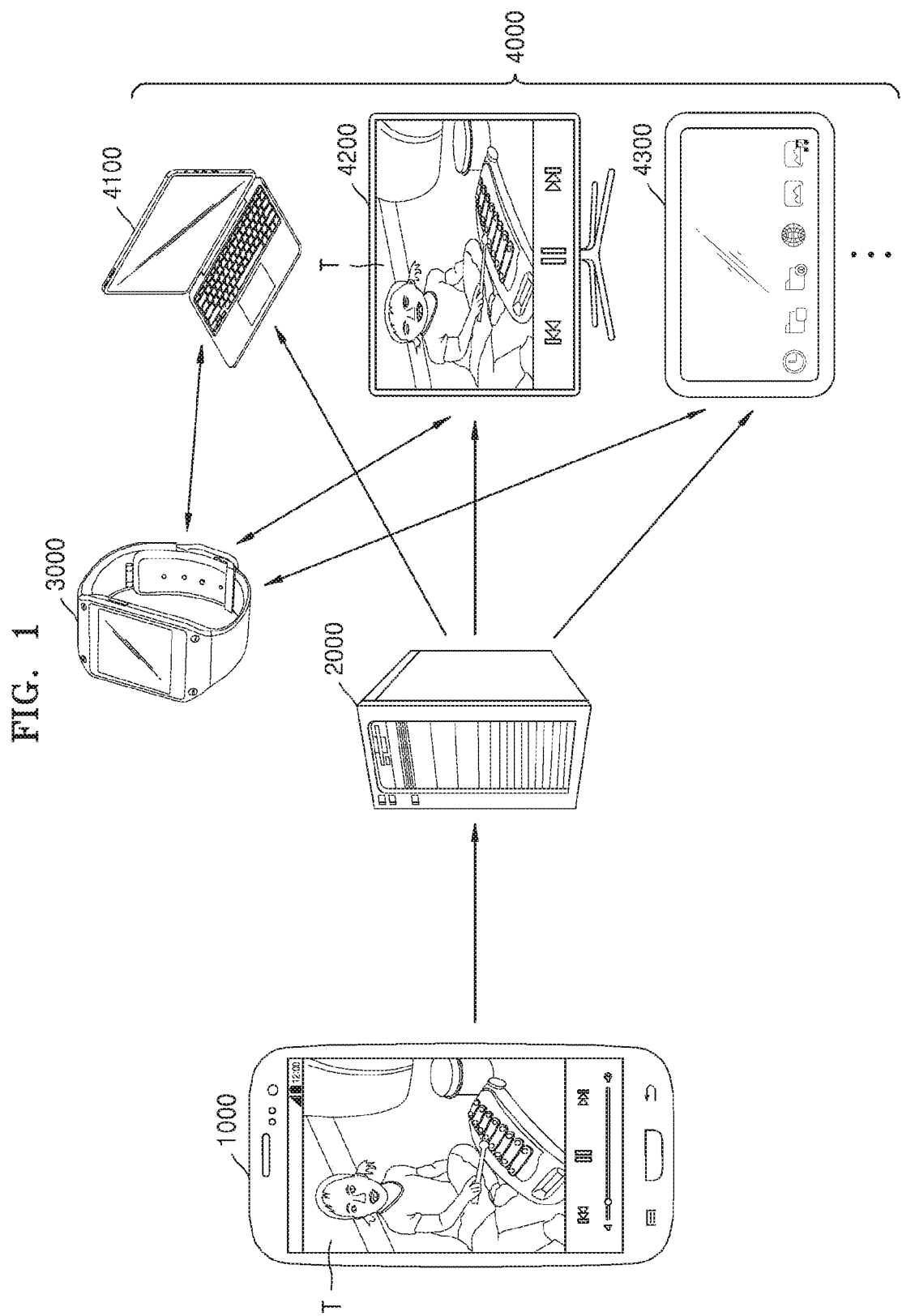
FIG. 1 is a schematic view of a system in which a device, which is performing a task, transmits information about the task to an external device located near the device via a server according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The attached drawings for illustrating various embodiments of the present disclosure are referred to in order to gain a sufficient understanding of the present disclosure, the merits thereof, and the objectives accomplished by the implementation of the present disclosure. Hereinafter, the present disclosure will be described in detail by explaining various embodiments of the present disclosure with reference to the attached drawings. Like reference numerals in the drawings denote like elements.

In the present specification, when a constituent element "connects" or is "connected" to another constituent element, the constituent element contacts or is connected to the other constituent element not only directly but also electrically through at least one of other constituent elements interposed there between. Also, when a part is said to "include" a certain constituent element, unless specified otherwise, it may not be construed to exclude another constituent element but may be construed to further include other constituent elements.

In addition, a device or an external device described in the present specification may be, for example, a smartphone, a mobile phone, a tablet personal computer (PC), a personal digital assistant (PDA), a laptop computer, a PC, a global positioning system (GPS), or other mobile or non-mobile devices, but is not limited thereto. In addition, for example, the device may be a smartphone or a tablet PC, and the external device may include home appliance or various devices installed at home. The external device is a concept distinguished from a device used by a user in an embodiment of the present disclosure, and may receive information about a task being performed by using the device. Examples of the external device may include, without limitation, a television (TV), a tablet PC, a laptop computer, an illumination, a refrigerator, audio equipment, a washing machine, an oven, a gas range, a home gateway, a game player, an electronic blackboard, and a touch table.

In addition, in the present specification, a task performed by using a device may be an operation performed by using the device, for example, an operation performed via a predetermined application. The task may be, for example, playing a moving picture, playing music, writing an email, drafting a document, receiving weather information, displaying news information, executing a game, or taking a picture, which is performed by using the device via an operation of an application. However, the task is not limited to these listed examples.

In addition, in the present specification, information about the task may include a type of the task, a type of a service provided via the task, a type of an application executed to perform the task, a type of a device that performs the task, identification information of a device performing the task, performance information of a device performing the task, authentication information of a user of the task, a type of content related to performing of the task, capacity information of the content, resolution information of the content, uniform resource locator (URL) information for receiving the content, and information about an input device used to perform the task.

In addition, in the present specification, only a first external device 4100 and a second external device 4200 are illustrated and described from among a plurality of external devices 4000, or a third external device 4300 is illustrated in some embodiments. However, the various embodiments are not limited thereto. According to various embodiments of the present disclosure, the plurality of external devices 4000 may include four or more external devices.

Hereinafter, the present disclosure will be described in detail with reference to the attached drawings.

FIG. 1 is a schematic view of a system in which a device 1000, which is performing a task, transmits information about the task to an external device 4000 located near the device 1000 via a server 2000 according to an embodiment of the present disclosure.

Referring to FIG. 1, the system for transmitting information about a task, according to an embodiment of the present disclosure, may include the device 1000, the server 2000, a wearable device 3000, and a plurality of external devices 4000. The plurality of external devices 4000 may include a first external device 4100, a second external device 4200, and a third external device 4300.

Referring to FIG. 1, a task performed by using the device 1000 may pass through the server 2000 and be continuously performed by using one of the external devices 4000. In detail, information about a task performed by using the device 1000 may be transmitted to one of the plurality of external devices 4000, which is, for example, the second external device 4200, and the second external device 4200 that has received the information about the task may continuously perform the task based on the information about the task. The device 1000 and the server 2000 or the server 2000 and the plurality of external devices 4000 may be connected to each other in a wired or wireless manner. While the device 1000 and the server 2000 or the server 2000 and the plurality of external devices 4000 may be connected to each other via at least one communication method from among, for example, Wi-Fi, Bluetooth, Bluetooth low energy (BLE), near field communication (NFC), radio frequency identification (RFID), or data communication via a cellular network, the communication method is not limited thereto. In addition, the device 1000 and the server 2000 or the server 2000 and the plurality of external devices 4000 may be connected to each other via, for example, an optical cable, an unshielded twisted pair (UTP) cable, a coaxial cable or a socket, but are not limited thereto.

The device 1000 may be, for example, a mobile computing device having a communication function such as a smartphone or a tablet PC. The device 1000 may store, for example, a type of the task, a type of an application operated to perform the task, a type of content included in the task, URL information for receiving the content, and performance history information of the task. The device 1000 may transmit information about the task to the server 2000.

The wearable device 3000 may identify a plurality of external devices 4000 located near the wearable device 3000. The wearable device 3000 may be a computing device that can be worn on a portion of the body of a user. The wearable device 3000 may be, for example, a watch, glasses or a hair band having a communication function and a data processing function, but is not limited thereto. The wearable device 3000 may be connected to the plurality of external devices 4000 in a wired or wireless manner. The wearable device 3000 may, for example, transmit a short range wireless communication signal to the plurality of external devices 4000 or receive a wireless communication signal transmitted by the plurality of external devices 4000. The wearable device 3000 may store authentication information of a user of the device 1000 so that the user may continuously perform the task by using one of the plurality of external devices 4000.

The server 2000 may receive information about a task that is being performed by using the device 1000, and receive from the wearable device 3000 an information value about a distance with respect to the plurality of external devices 4000 located near the wearable device 3000 and an identification value of each of the plurality of external devices 4000. Also, the server 2000 may transmit information about the task to one of the plurality of external devices 4000. According to an embodiment of the present disclosure, the server 2000 may transmit information about the task to the second external device 4200.

The plurality of external devices 4000 may include the first external device 4100, the second external device 4200, and the third external device 4300, but are not limited thereto. Examples of the plurality of external devices 4000 may include a TV, a tablet PC, a laptop computer, an illumination, a refrigerator, audio equipment, a washing machine, an oven, a gas range, a home gateway, a game player, an electronic blackboard, and a touch table. Referring to the embodiment of FIG. 1, the first external device 4100 may be a laptop computer, the second external device 4200 may be a TV, and the third external device 4300 may be a tablet PC.

According to an embodiment of the present disclosure, when the device 1000 is a smartphone and a user of the device 1000 who is performing a task T of watching a movie by using the device 1000 enters a home, the wearable device 3000 may identify a plurality of external devices 4000 located near the wearable device 3000, and the server 2000 may provide the second external device 4200, for example, a TV, with information such as a capacity of movie content, a resolution of the movie content, a playback length of the movie content, URL information of a server that provides the movie content, from the device 1000, so that the task T may be continuously performed, that is, so that the movie content may be continuously played on the TV.

Figure 2:
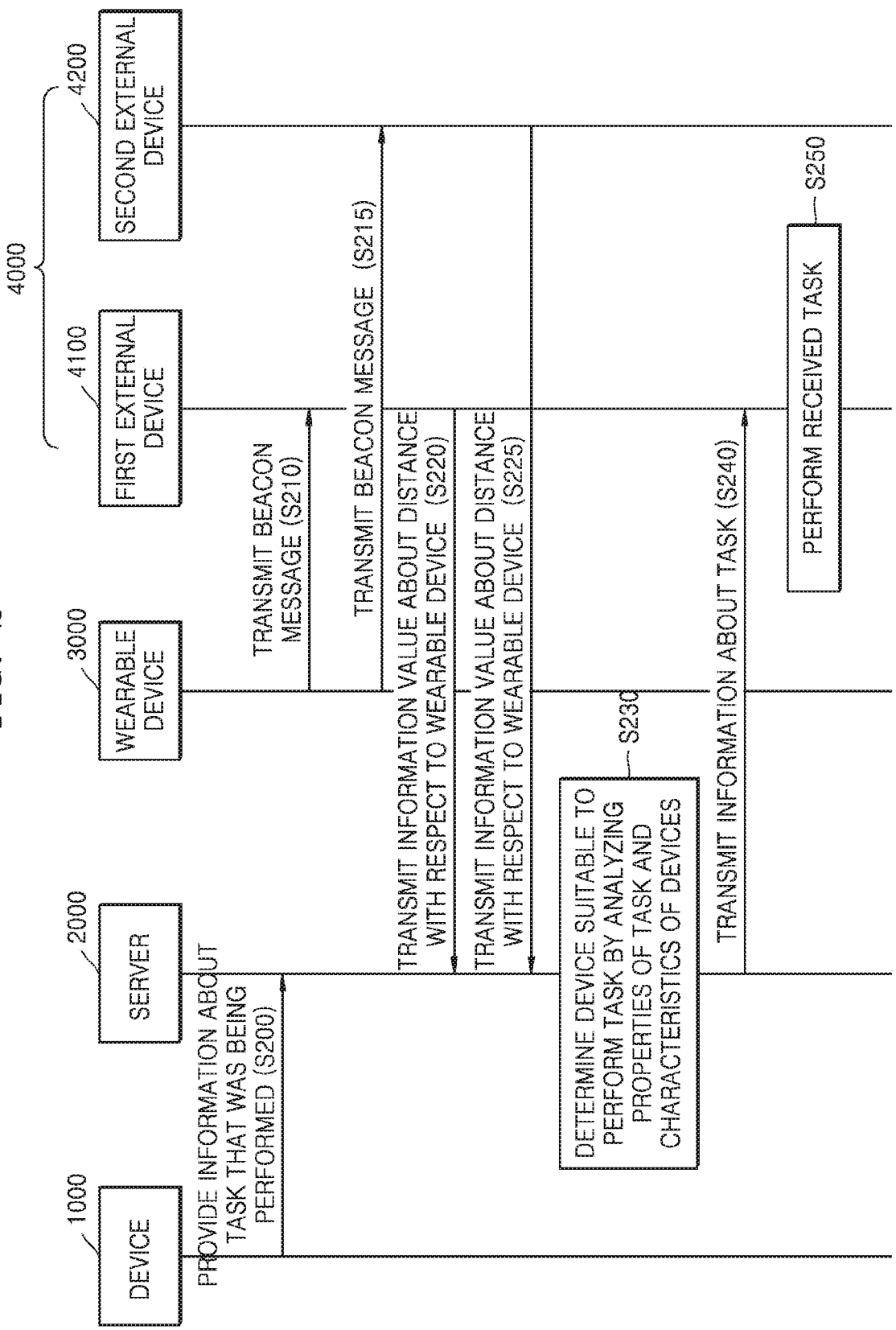
FIG. 2 is a flowchart of a method of transmitting information about a task that is being performed by using a device to an external device located near the device via a server, wherein the method is performed by using the device according to an embodiment of the present disclosure.

FIG. 2 is a flowchart of a method of transmitting information about a task that is being performed by using a device 1000 to an external device 4000 located near the device via a server 2000, wherein the method is performed by using the device 1000 according to an embodiment of the present disclosure.

Referring to FIG. 2, in operation S200, the device 1000 provides the server 2000 with information about a task that was being performed by using the device 1000. The device 1000 may perform a task, for example, of playing a moving picture, playing music, writing an email, drafting a document, receiving weather information, displaying news information, executing a game, or taking a picture. The information about the task may include, for example, a type of the task, a type of a service provided via the task, a type of an application operated to perform the task, identification information of the device 1000, performance information of the device 1000, authentication information of a user of the task, and a type of content included in the task.

The device 1000 may provide the server 2000 with the information about the task in a wired or wireless manner. The device 1000 may transmit the information about the task by using at least one wireless communication method from among, for example, Wi-Fi, Bluetooth, BLE, NFC, RFID, and data communication via a cellular network or by using at least one wired communication method such as a communication method via an optical cable, a UTP cable, or a coaxial cable.

In operations S210 and S215, the wearable device 3000 transmits a short range wireless communication signal to each of the plurality of external devices 4000. The wearable device 3000 may transmit a short range wireless communication signal so as to identify the plurality of external devices 4000 located near the wearable device 3000.

The short range wireless communication signal may include a beacon, NFC, ZigBee communication, RFID communication, ultra-wide band (UWB) communication, and Bluetooth communication, but is not limited thereto. According to an embodiment of the present disclosure, the wearable device 3000 may transmit a beacon message to each of the first external device 4100 and the second external device 4200.

In operations S220 and S225, the plurality of external devices 4000 transmits an information value about a distance between each of the plurality of external devices 4000 and the wearable device 3000 to the server 2000. The server 2000 identifies the plurality of external devices 4000 located near the wearable device 3000 based on the received information value about the distance between each of the plurality of external devices 4000 and the wearable device 3000.

According to an embodiment of the present disclosure, the first external device 4100 may transmit an information value about a distance between the wearable device 3000 and the first external device 4100 to the server 2000. Likewise, the second external device 4200 may transmit an information value about a distance between the wearable device 3000 and the second external device 4200 to the server 2000. According to an embodiment of the present disclosure, the first external device 4100 and the second external device 4200 may transmit the information value about the distance in a wireless manner. For example, the first external device 4100 and the second external device 4200 may transmit the information value about the distance to the server 2000 via at least one of Wi-Fi, data communication via a cellular network, a beacon, NFC, ZigBee communication, RFID communication, UWB communication, and Bluetooth communication.

Information about a distance between the wearable device 3000 and the first external device 4100 and a distance between the wearable device 3000 and the second external device 4200 may be calculated based on wireless communication signals that are respectively transmitted by the first external device 4100 and the second external device 4200 and a short range wireless communication signal that is received by the wearable device 3000, wherein each of the distances between the wearable device 3000 and the first external device 4100 and between the wearable device 3000 and the second external device 4200 is calculable from the short range wireless communication signal.

According to an embodiment of the present disclosure, a wireless communication signal transmitted by the first external device 4100 and the second external device 4200 to the server 2000 may be different from a short range wireless communication signal transmitted by the wearable device 3000 to the first external device 4100 and the second external device 4200 in operations S210 and S215. In detail, a wireless communication signal transmitted by each of the first and second external devices 4100 and 4200 to the server 2000 may include device identification information of each of the first external device 4100 and the second external device 4200. For example, the device identification information may include at least one of information about functions of the plurality of external devices 4000, information about a communication method available to the plurality of external devices 4000, connection information for connecting the plurality of external devices 4000 with the wearable device 3000, information about an application installed on the plurality of external devices 4000, and information about an application for controlling the plurality of external devices 4000, but is not limited thereto. According to an embodiment of the present disclosure, the device identification information may include an identification value (e.g., a subsystem identifier (SSID)) of each device. The server 2000 may receive the device identification information to thereby obtain information about the external device 4000 identified by the wearable device 3000.

According to an embodiment of the present disclosure, information about a distance between the wearable device 3000 and the first external device 4100 and a distance between the wearable device 3000 and the second external device 4200 may include information indicating whether each of the first external device 4100 and the second external device 4200 is on an active status for receiving information about a task and for performing function related to the task.

In operation S230, the server 2000 may analyze properties of the task and characteristics of each of the plurality of external devices 4000 so as to determine a device that is suitable to continuously perform the task.

The properties of the task may be analyzed based on the information about the task received from the device 1000 in operation S200. Examples of the properties of the task may include a type of the task, a type of a service provided to perform the task, a type of an application operated to perform the task, authentication information of a user of the task, a type of content included in the task, capacity information of the content, resolution information of the content, URL information for receiving the content, and information about an input device used to perform the task.

Analysis of characteristics of each of the plurality of external devices 4000 may include analysis of a type of a device that performs the task, identification information of a device performing the task, performance information of the device performing the task, a type of content used to perform the task, capacity information of the content, utilization capability of the device for utilizing the content, and information indicating whether an input device used to perform the task is available or not.

The server 2000 may determine an external device suitable to continuously perform a task by analyzing characteristics of each of the plurality of external devices 4000 and a use pattern of a user of the device. The use pattern will be described later with reference to FIG. 6.

According to an embodiment of the present disclosure, the server 2000 may analyze the properties of the task and the characteristics of each of the plurality of external devices 4000 so as to determine the first external device 4100 as a device suitable to continuously perform the task. However, this is, and the server 2000 may also determine the second external device 4200 or one of the plurality of external devices 4000 which is not shown, as a device suitable to continuously perform the task.

In operation S240, the server 2000 transmits the information about the task to the device determined in operation S230.

According to an embodiment of the present disclosure, the server 2000 may transmit the information about the task to the first external device 4100 in a wired or wireless manner. For example, the server 2000 may transmit the information about the task to the first external device 4100 via at least one wireless communication method from among, for example, Wi-Fi, Bluetooth, BLE, NFC, RFID, and wireless data communication or via at least one wired communication method such as a communication method via an optical cable, a UTP cable, or a coaxial cable.

In operation S250, the first external device 4100 continuously performs the task based on the information about the task received from the server 2000. The first external device 4100 may continuously perform the task which was being performed by using the device 1000 after a point of time when the device 1000 has transmitted the information about the task to the server 2000. For example, if the task is playback of a moving picture, the first external device 4100 may play the moving picture from a point when the device 1000 was transmitting information about playing the moving picture to the server 2000.

Figure 3:
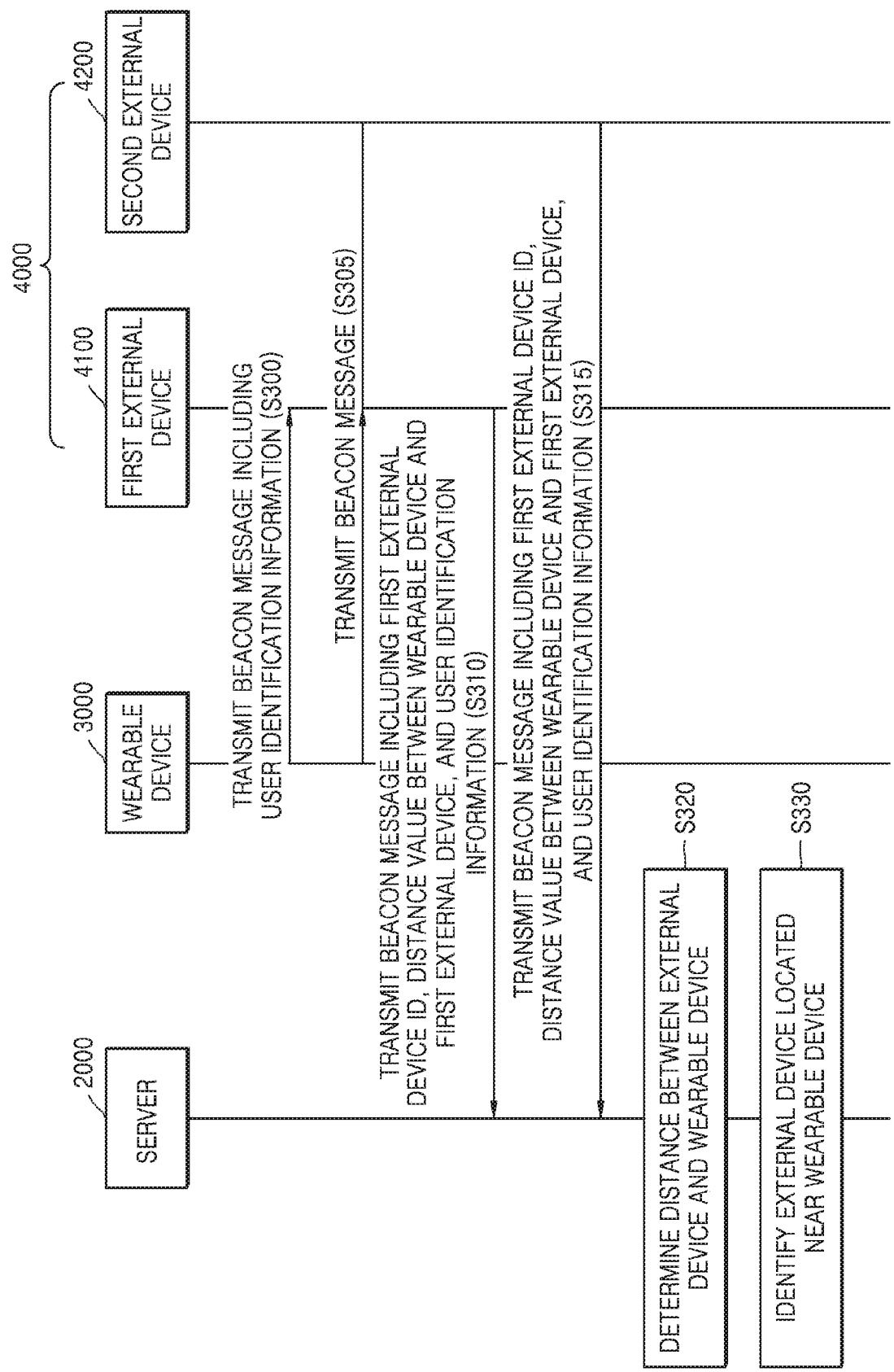
FIG. 3 is a flowchart of a method of providing a server with information about distances between a wearable device and an external device located near the wearable device, wherein the method is performed by using the wearable device according to an embodiment of the present disclosure.

FIG. 3 is a flowchart of a method of providing a server 2000 with information about a distance between a wearable device 3000 and an external device 4000 located near the wearable device 3000, wherein the method is performed by using the wearable device 3000 according to an embodiment of the present disclosure.

Referring to FIG. 3, the wearable device 3000 may transmit a short range wireless communication signal including user identification information to each of a plurality of external devices 4000, and each of the plurality of external devices 4000 may transmit, for example, identification information of the plurality of external devices 4000 or information about a distance between the wearable device 3000 and each of the plurality of external devices 4000 to the server 2000. The server 2000 may determine a distance between each of the plurality of external devices 4000 and the wearable device 3000.

In operations S300 and S305, the wearable device 3000 transmits a short range wireless communication signal including identification information of a user who is using the wearable device 3000 to the first external device 4100 and the second external device 4200. According to an embodiment of the present disclosure, the wearable device 3000 may be used by being worn on a portion of the body of the user such as the wrist or the head. The wearable device 3000 may transmit the user identification information to the first external device 4100 and the second external device 4200 via, for example, a beacon, NFC, ZigBee communication, RFID communication, UWB communication or Bluetooth communication. According to an embodiment of the present disclosure, the wearable device 3000 may transmit a beacon signal to an external device located near the wearable device 3000, and the first external device 4100 and the second external device 4200 may be located near the wearable device 3000. The user identification information may indicate user authentication information whereby the user of the wearable device 3000 is identifiable. For example, the user identification information may indicate an ID and password information of the user who wears the wearable device 3000 to use the same.

In operation S310, the first external device 4100 transmits device identification information of the first external device 4100, information about a distance between the wearable device 3000 and the first external device 4100, and user identification information, to the server 2000. In operation S315, the second external device 4200 transmits device identification information of the second external device 4200, information about a distance between the wearable device 3000 and the second external device 4200, and user identification information, to the server 2000. The device identification information may include, for example, an SSID or a model number, but is not limited thereto.

According to an embodiment of the present disclosure, a wireless communication signal transmitted by the first external device 4100 and the second external device 4200 to the server 2000 may be a different communication signal from a short range wireless communication signal transmitted by the wearable device 3000 in operations S300 and S305 to the first external device 4100 and the second external device 4200.

In operation S320, the server 2000 determines a distance between the wearable device 3000 and the first external device 4100 and a distance between the wearable device 3000 and the second external device 4200. The server 2000 may determine the distance between the wearable device 3000 and the first external device 4100 and the distance between the wearable device 3000 and the second external device 4200 based on the device identification information and the information about the distance received from each of the first external device 4100 and the second external device 4200.

In operation S330, the server 2000 identifies an external device located near the wearable device 3000, from among the plurality of external devices 4000. According to an embodiment of the present disclosure, external devices located near the wearable device 3000 may be the first external device 4100 and the second external device 4200. The server 2000 may identify the first external device 4100 and the second external device 4200 based on the received device identification information such as an SSID or a device model number.

FIG. 4 illustrates an example in which the wearable device 3000 described with reference to the flowchart of FIG. 3 transmits a short range wireless signal to the plurality of external devices 4100 and 4200, and the plurality of external devices 4100 and 4200 that have received the short range wireless signal transmit information about a distance between the wearable device 3000 and the plurality of external devices 4100 and 4200 to the server 2000 according to an embodiment of the present disclosure.

Referring to FIG. 4, the wearable device 3000 may transmit a short range wireless communication signal to the first external device 4100 and the second external device 4200 located near the wearable device 3000. According to an embodiment of the present disclosure, the wearable device 3000 may be a mobile computing device that is in the form of a watch having a communication function and a data processing function and is worn on the wrist. Also, according to an embodiment of the present disclosure, the first external device 4100 may be a laptop computer, and the second external device 4200 may be a TV having a wireless communication function, but the various embodiments of the present disclosure are not limited thereto. Details other than those described above have been described with reference to operations S300 and S305, and thus a description thereof will not be repeated here.

The first external device 4100 and the second external device 4200 may transmit device identification information of the first external device 4100, information about a distance between the wearable device 3000 and the first external device 4100, and user identification information to the server 2000. Description already provided with reference to operations S310 and S315 will be omitted here.

FIG. 5 is a flowchart of a method of transmitting, performed by using a wearable device 3000, a signal indicating whether an external device 4000 located near the wearable device 3000 is activated, to the external device 4000, and a method of providing, performed by using the external device 4000, a server 2000 with the information according to an embodiment of the present disclosure.

Referring to FIG. 5, in operations S500 and S505, the wearable device 3000 transmits a short range wireless communication signal including a signal indicating whether a device is activated (presence signal), to a plurality of external devices 4000. According to an embodiment of the present disclosure, the short range wireless communication signal may include the presence signal which is a signal indicating whether each of the plurality of external devices 4000 is on an active status for receiving information about a task from the server 2000 and performing a function related to the task. An external device that has received the presence signal indicating whether the external device is on the active status, that is, a first external device 4100 and a second external device 4200 according to the present embodiment of the present disclosure, may respectively transmit a signal indicating whether the first external device 4100 is activated and a signal indicating whether the second external device 4200 is activated, to the server 2000.

In operations S510 and S515, the first external device 4100 and the second external device 4200 respectively transmit the signal indicating whether the first external device 4100 is activated and the signal indicating whether the second external device 4200 is activated to the server 2000. Also, the first external device 4100 and the second external device 4200 respectively transmit device identification information of the first external device 4100 and device identification information of the second external device 4200 (e.g., an SSID, a device model number, etc.) to the server 2000.

Information indicating whether the first external device 4100 and the second external device 4200 are activated may include information indicating whether a function whereby the first external device 4100 and the second external device 4200 are able to receive information about a task from the server 2000 or to perform a task. The information may be an important criterion for determining whether the first external device 4100 and the second external device 4200 are able to continuously perform a task that was being performed by using the device 1000 after the first external device 4100 and the second external device 4200 are synchronized with the device 1000 (see FIG. 1). For example, an external device that does not transmit the information about activation, from among the plurality of external devices 4000, may not be able to receive information about a task of the device 1000 stored by using the server 2000, and is in a state of being unable to continuously perform the task.

In operation S520, the server 2000 may receive information indicating whether the plurality of external devices 4000 are activated, from the plurality of external devices 4000 so as to determine whether the plurality of external devices 4000 are activated. According to an embodiment of the present disclosure, the server 2000 may determine whether the first external device 4100 and the second external device 4200 are activated based on information indicating whether a function of receiving information about a task transmitted by each of the first external device 4100 and the second external device 4200 and a function of performing the task are activated. The server 2000 may identify only a device that has transmitted a signal including the information indicating whether the external devices 4000 are activated, from among the plurality of external devices 4000 and then may transmit information about a task to the external device that is in an activated state later (refer to FIG. 2 regarding transmission of information about a task).

FIG. 6 is a flowchart of a method of receiving, performed by using a server 2000, device identification information and information about a task performing history from a device 1000 and determining, performed by using the server 2000, a device suitable to perform the task from among external devices 4000 based on the device identification information and the information about the task performing history according to an embodiment of the present disclosure.

Referring to FIG. 6, in operations S600, S602, and S604, the device 1000, a first external device 4100, and a second external device 4200 respectively provide the server 2000 with device identification information and information about a task performing history thereof. In detail, the device 1000 may transmit identification information of the device 1000, for example, information such as an SSID or device model number to the server 2000. Also, the device 1000 may transmit log information including, for example, information about a history of tasks that have been performed by using the device 1000 such as the number of times of performing a task, a type of tasks performed according to a device type, a type of a service received while performing a task, a type of an application used to perform a task, or URL information for receiving content when a task for receiving the content is performed. Like the device 1000, the first external device 4100 and the second external device 4200 may also transmit device identification information and information about a task performing history thereof to the server 2000. The device 1000, the first external device 4100, and the second external device 4200 may provide the server 2000 with device identification information and information about a task performing history thereof in a wired or wireless manner. The device 1000, the first external device 4100, and the second external device 4200 may transmit the device identification information and the information about a task performing history via at least one wireless communication method such as Wi-Fi, Bluetooth, BLE, NFC, RFID, or data communication via a cellular network or using at least one wired communication method such as a communication method via an optical cable, a UTP cable, and a coaxial cable.

In operation S610, the server 2000 analyzes a user pattern of each device based on the device identification information and the information about a task performing history. According to an embodiment of the present disclosure, the server 2000 may analyze a device selection preference of a user according to a type of a task based on the received device identification information and the received information about a task performing history. The server 2000 may identify the received device identification information to thereby analyze information about device characteristics such as a type of a device, a resolution of a device, a type of a task that a device is able to perform, device performance, and an input device included in a device. In addition, the server 2000 may analyze a use pattern including a device preference by the user based on log information of a user including, for example, the number of times of performing a task according to device types, a type of a task performed according to device types, a type of a service received while performing a task, a type of an application used to perform a task, or URL information for receiving content if a task of receiving the content is performed.

In operation S620, the device 1000 provides the server 2000 with information about a task performed by using the device 1000. The device 1000 may perform a task of executing an application including, for example, playing a moving picture, playing music, writing an email, drafting a document, receiving weather information, displaying news information, executing a game, or taking a picture. Examples of the information about a task may include a type of the task, a type of a service provided via the task, a type of an application operated to perform the task, identification information of the device 1000, performance information of the device 1000, authentication information of a user of the task, and information about a type of content included in the task.

In operation S630, the server 2000 determines an external device suitable to continuously perform the task that was being performed by using the device 1000 based on analysis of characteristics of each device and the use pattern of the user. In detail, the server 2000 may determine an external device to continuously perform the task that was being performed by using the device 1000 from among a plurality of external devices 4000 based on a device selection preference by the user according to characteristics of devices and characteristics of tasks. Analysis of the use pattern of the user according to the characteristics of the devices and the characteristics of the tasks will be described in detail later with reference to FIG. 7.

In operation S640, the server 2000 transmits information about a task to the first external device 4100. According to an embodiment of the present disclosure, the server 2000 may analyze device characteristics and task logs of a user in operation S630 so as to select the first external device 4100 as a device suitable to continuously perform the task that was being performed by using the device 1000. The server 2000 may transmit information about the task that was being performed by using the device 1000 to the first external device 4100 via wired or wireless communication.

In operation S650, the first external device 4100 continuously performs the task based on the information about the task received from the server 2000. The first external device 4100 may continue performing the task that was being performed by using the device 1000 from a point when the device 1000 transmitted the information about the task to the server 2000.

FIG. 7 illustrates an example of information about a task according to an embodiment of the present disclosure.

Referring to FIG. 7, the information about the task includes a device ID field 700, a task type field 710, an application field 720, a content capacity field 730, a content resolution field 740, a running time field 750, a content URL field 760, an input device field 770, and an authentication information field 780. However, the information about the task is not limited to the above-listed fields.

The device ID field 700 may include device identification information corresponding to the device 1000 or the plurality of external devices 4000. According to an embodiment of the present disclosure, the device ID field 700 may include an SSID or a model number of a device. For example, the device ID field 700 may include device identification information of a device such as a TV, a laptop computer, or a tablet PC.

The task type field 710 may include a task performed by a user by using respective devices. For example, the task type field 710 may include "watching movie," "writing an email," "drafting a document," and "executing a game."

The application field 720 may include information about a type of an application used by a user when the user performs a task. For example, the application field 720 may include an application type regarding an email writing application, a Word application, or a game application. According to an embodiment of the present disclosure, the user may execute an Outlook application to write an email, may execute a Word program to draft a document, or execute a game to play Angry Birds.

The content capacity field 730 may include information about a capacity of content when the content is downloaded to perform a task. For example, capacity information such as 3.5 GB, 500 KB, 1.5 MB or 25 MB may be included in the content capacity field 730. According to an embodiment of the present disclosure, when the user watches a movie, a capacity of a movie file downloaded from a content providing server may be 3.5 GB. When writing an email, a capacity of the email may be 500 KB. When drafting a document, a capacity of the drafted document may be 1.5 MB. When playing a game, a capacity of the game downloaded from a game service providing server may be 25 MB.

The content resolution field 740 may include information about a resolution of content when the content is downloaded to perform a task. For example, a resolution of the content may be 1920×1080 (Full HD), 1024×768 (XGA) or 1280×720 (HD). According to an embodiment of the present disclosure, if a user watches a movie, a resolution of a movie file downloaded from a content providing server may be 1920×1080, which is a Full HD image. If a user writes an email or drafts a document, a resolution may be 1024×768 which is XGA resolution, and if a user plays a game, a screen of a game downloaded from a game service providing server may have a resolution of 1280×720 which is HD resolution.

The running time field 750 may include a running time indicating a processing degree of a task that was being performed. For example, in the case of playing a movie, the time period that the movie was played, that is, a playback length may be recorded. Also, when writing an email or drafting a document, information such as pages of the email or the document or the number of written lines may be recorded. In the case of playing a game, information about a degree of progress in the game, that is, information about the level of the game may be recorded. According to an embodiment of the present disclosure, if a user watches a movie, a playback length of the movie, which is for example 1 h 8 min 25 sec, may be recorded. If a user writes an email or drafts a document, information indicating that the email or the document is written to 1 page and 15 lines may be recorded, and if a user plays a game, information indicating that the game has progressed to level 5 may be recorded.

The content URL field 760 may include information about a URL address of a server that provides content if the content is downloaded to perform a task.

The input device field 770 may include information about an input device used to perform a task. For example, the input device field 770 may include information such as a remote controller when watching a movie via TV, a keyboard or a mouse when writing an email or drafting a document by using a laptop computer, or a touch input when playing a game by using a tablet PC.

The authentication information field 780 may include information indicating whether authentication information is necessary for a user to perform a task.

Information included in various fields described above may be analyzed by using the server 2000 together with characteristics of devices. The server 2000 may determine, from among the plurality of external devices 4000, an external device that is suitable to continuously perform a task that was being performed by using the device 1000 based on the information about the task. For example, if the device 1000 is a smartphone, and a user who was performing a task of watching a movie by using the device 1000 enters home, the server 2000 may analyze a capacity of movie content, a resolution of the movie content, a playback length of the movie content, URL information of a server that provides the movie content or the like, from the device 1000 and provide the above-described information to the TV so that the movie is continuously played on a TV. In addition, for example, when the device 1000 performs a task of writing an email, the server 2000 may analyze a type of an application for writing an email, resolution information of the email, input device information or the like and determine a laptop computer to continuously write the email and provide the laptop computer with the above-described information. Also, the information about the task may be used by one of the plurality of external devices 4000 to determine an application to execute content. For example, the third external device 4300 (see FIG. 1) may be determined to perform a game application that was being performed by using the device 1000.

Figure 8:
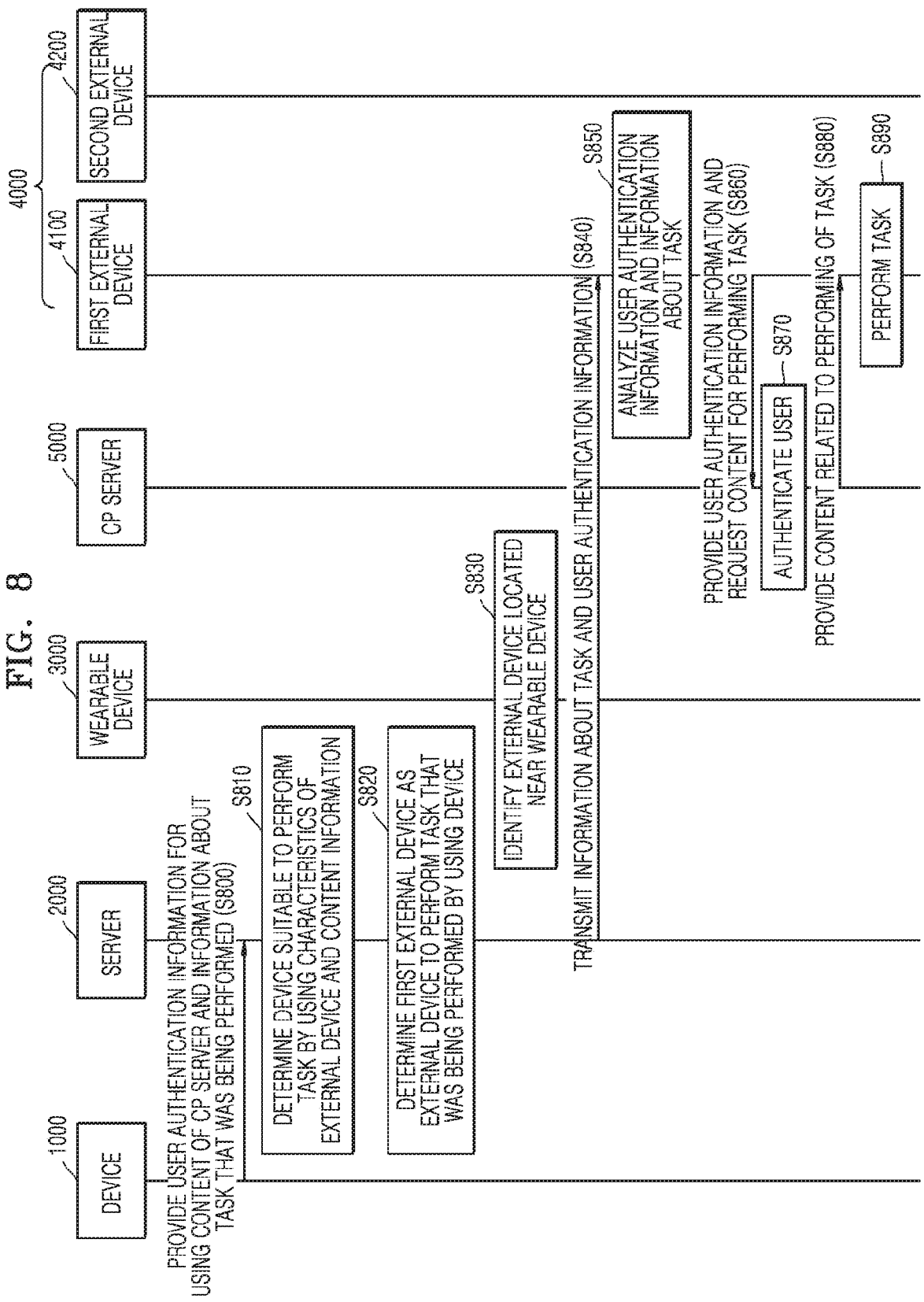
FIG. 8 is a flowchart of a method of providing, performed by using a device, an external device with information about a task that was being performed by using the device, via a content providing server, and continuously performing, performed by using a first external device, the task by using the content providing server according to an embodiment of the present disclosure.

FIG. 8 is a flowchart of a method of providing, performed by using a device 1000, an external device 4000 with information about a task that was being performed by using the device 1000, via a content providing server 5000, and continuously performing, performed by using a first external device 4100, the task by using the content providing server 5000 according to an embodiment of the present disclosure.

Referring to FIG. 8, in operation S800, the device 1000 provides the server 2000 with user authentication information for using content provided by using the content providing server 5000 and information about a task that was being performed by using the device 1000. The device 1000 may perform a task for executing an application such as playing a moving picture, playing music, writing an email, receiving weather information, displaying news information, and executing a game. The device 1000 may download content from the content providing server 5000 when performing the task. The content providing server 5000 may provide content such as a movie, music or a game. The device 1000 may store user authentication information for using the content from the content providing server 5000. The device 1000 may provide the server 2000 with the user authentication information. Also, the device 1000 may provide the server 2000 with information about a task performed via the content providing server 5000. The information about the task may include information included in various fields, such as the task type field 710, the application field 720, or the like. User authentication information for using the content may include, for example, information about an ID or a password registered to the content providing server 5000.

The device 1000 may provide the server 2000 with user authentication information or information about a task in a wired or wireless manner. The device 1000 may transmit the user authentication information and the information about the task to the server 2000 via at least one wireless communication method such as Wi-Fi, Bluetooth, BLE, NFC, RFID, and data communication via a cellular network or via at least one wired communication method such as a communication method via an optical cable, a UTP cable, or a coaxial cable.

In operation S810, the server 2000 determines an external device that is suitable to continuously perform the task that was being performed by using the device 1000 by using characteristics of a plurality of external devices 4000 and information about content provided by using the content providing server 5000. Characteristics of the plurality of external devices 4000 may include, for example, device identification information of the plurality of external devices 4000 (e.g., an SSID or a model number), device performance, or device resolution information. The information about the content may include, for example, a type of the content, an application in which the content is executed, a capacity of the content, a resolution of the content, or URL information of a server providing the content.

In operation S820, the server 2000 identifies an external device (e.g., the first external device 4100) suitable to continuously perform the task that was being performed by using the device 1000. However, the server 2000 may also determine the second external device 4200, or another external device, as an external device to continuously perform the task.

In operation S830, the wearable device 3000 identifies the plurality of external devices 4000 located near the wearable device 3000. According to an embodiment of the present disclosure, the wearable device 3000 may transmit a short range wireless communication signal including user authentication information which is able to receive the content via the content providing server 5000, to the plurality of external devices 4000 located near the wearable device 3000. Also, the plurality of external devices 4000 that have received the short range wireless communication signal may transmit an information value about a distance between the wearable device 3000 and each of the plurality of external devices 4000 to the server 2000. That is, the wearable device 3000 may identify external devices around the wearable device 3000 by using the same method as described with reference to operations S300, S305, S310, and S315 of FIG. 3. Thus, repeated description will be omitted here.

In operation S840, the server 2000 transmits information about a task and user authentication information to the first external device 4100. The user authentication information may include authentication information via which a user of the first external device 4100 may download content from the content providing server 5000 and use the content. However, this is various, and the server 2000 may transmit information about a task and user authentication information to the second external device 4200 or another external device.

In operation S850, the first external device 4100 analyzes the received user authentication information and the received information about the task. The first external device 4100 may analyze, for example, a type of content, an application in which the content is executed, a capacity of the content, a resolution of the content, a URL information of a server providing the content, and user authentication information used for the content providing server 5000 in order to use the content.

In operation S860, the first external device 4100 may provide the content providing server 5000 with user authentication information, and requests from the content providing server 5000 content so as to continuously perform the task that was being performed by using the device 1000.

In operation S870, the content providing server 5000 authenticates a user of the first external device 4100. According to an embodiment of the present disclosure, the content providing server 5000 may authenticate the user of the first external device 4100 based on the user authentication information received from the first external device 4100. For example, the user authentication information may include information about an ID or a password registered to the content providing server 5000.

In operation S880, the content providing server 5000 provides the first external device 4100 with content related to performing the task. According to an embodiment of the present disclosure, the content providing server 5000 may continuously provide the first external device 4100 with the content that the user has been receiving from the device 1000, based on the user authentication information received from the first external device 4100. For example, when the content providing server 5000 provides the device 1000 with movie content, the device 1000 stores a playback length log value corresponding up to a point when the device 1000 was transmitting information about a task of providing the movie content to the server 2000, and when the first external device 4100 requests the content via user authentication information, the device 1000 may continuously provide the first external device 4100 with the movie content by using the stored log value.

In operation S890, the first external device 4100 performs the task that uses the content received from the content providing server 5000.

Figure 9:
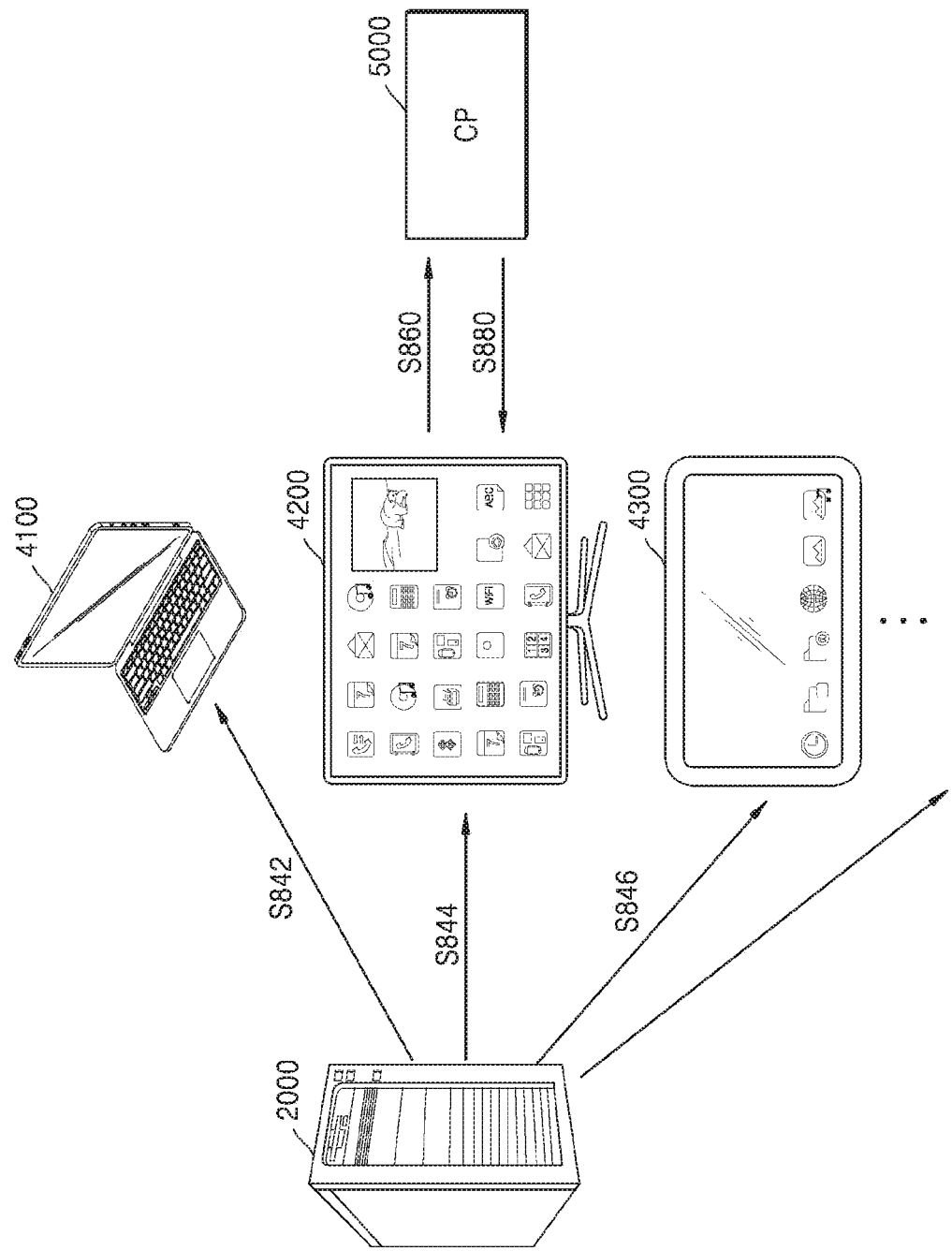
FIG. 9 illustrates an example in which a first external device receives information about a task from a server and continuously performs the task by using a content providing server according to an embodiment of the present disclosure.

FIG. 9 illustrates an example in which a first external device 4100 receives information about a task from a server 2000 and continuously performs the task by using a content providing server 5000 according to an embodiment of the present disclosure.

Referring to FIG. 9, as an example, the first external device 4100 may be a laptop computer, a second external device 4200 may be a TV, and a third external device 4300 may be a tablet PC. The server 2000 may transmit information about a task that was being performed by using the device 1000 (see FIG. 8) and user authentication information for requesting content from the content providing server 5000 to each of the first external device 4100, the second external device 4200, and the third external device 4300 (operations S842, S844, and S846). According to an embodiment of the present disclosure, the second external device 4200 may transmit user authentication information for requesting content from the content providing server 5000, to the content providing server 5000, and may request from the content providing server 5000 content for performing the task in operation S860. The content providing server 5000 may provide the second external device 4200 with content related to performing of the task in operation S880. Details other than those described above have been described with respective operations of FIG. 8, and thus a description thereof will not be repeated here.

Figure 10C:
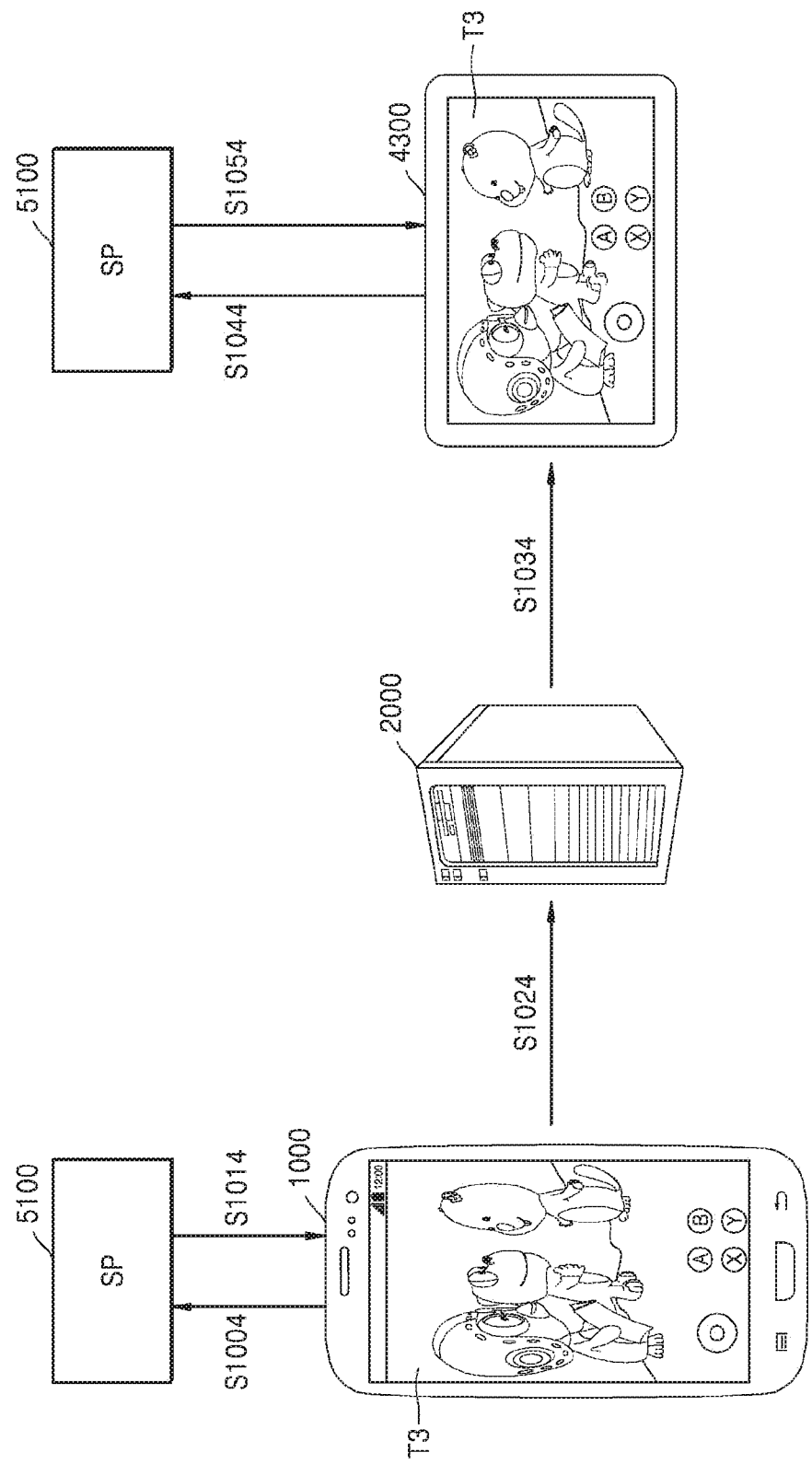
FIG. 10C illustrates an example where a game that was being played by using a device by using a content providing server, is continuously played by using a third external device according to an embodiment of the present disclosure.

FIGS. 10A through 10C respectively illustrate examples where information about tasks of playing a moving picture, writing an email, and executing a game is transmitted from a device 1000 to a plurality of external devices 4000 via a server 2000 so that the tasks are continuously performed on one or more of the plurality of external devices 4000 according to various embodiments of the present disclosure.

Referring to FIG. 10A, the device 1000 may perform a task T1 of playing a moving picture. The device 1000 may download content of the moving picture from the content providing server 5000 to perform the task T1. According to an embodiment of the present disclosure, the device 1000 transmits user authentication information for downloading the content to the content providing server 5000 and requests the moving picture content in operation S1000. The content providing server 5000 analyzes the user authentication information received from the device 1000 and provides the device 1000 with the content of the moving picture based on the user authentication information in operation S1010. The device 1000 transmits the user authentication information and information about the task T1 to the server 2000 in operation S1020. The information about the task T1 may include, for example, a capacity of the moving picture, a resolution of the moving picture, and a playback length of the moving picture.

According to an embodiment of the present disclosure, when a user of the device 1000 enters home from the outside, the server 2000 identifies external devices around the user, and analyzes characteristics of identified devices and the information of the task T1 so as to select the second external device 4200 that is suitable to continuously play the moving picture. According to an embodiment of the present disclosure, the user of the device 1000 may be wearing the wearable device 3000 (e.g., see FIG. 8) on a portion of the body, and the wearable device 3000 may identify external devices located near the wearable device 3000. For example, the second external device 4200 may be a TV. The server 2000 transmits the user authentication information and the information about the task T1 to the second external device 4200 in operation S1030.

The second external device 4200 provides the content providing server 5000 with the user authentication information received from the server 2000, and requests from the content providing server 5000 the content of the moving picture in operation S1040. The content providing server 5000 provides the second external device 4200 with the requested content of the moving picture by analyzing the user authentication information in operation S1050.

According to an embodiment of the present disclosure, when the device 1000 performs the task T1 of watching the content of the moving picture, the device 1000 transmits user authentication information and information about the task T1 to the server 2000, and the server 2000 determines the second external device 4200 as an external device suitable to continuously watch the content of the moving picture, and the second external device 4200 may continuously perform the task T1.

Referring to FIG. 10B, the device 1000 may perform a task T2 of writing an email. When performing the task T2, the device 1000 may store information about the email in the content providing server 5000 or send the email to another email address via the content providing server 5000. According to an embodiment of the present disclosure, the device 1000 may store details of the email that was being written, in the content providing server 5000, or transmit user authentication information to the content providing server 5000 in order to send the email that was being written, in operation S1002. The content providing server 5000 may analyze the user authentication information received from the device 1000, and store the details of the email that was being written, based on the user authentication information in operation S1012. The device 1000 transmits the user authentication information and information about the task T2 to the server 2000 in operation S1022. The information about the task T2 may include details of the email, pages of an email to be written later, information about an email address to which the email is to be sent, or the like.

According to an embodiment of the present disclosure, when a user of the device 1000 enters home from the outside, the server 2000 identifies external devices around the user, and analyzes characteristics of identified devices and the information of the task T2 so as to select the first external device 4100 that is suitable to continuously write the email. According to an embodiment of the present disclosure, the user of the device 1000 may be wearing the wearable device 3000 (see FIG. 8) on a portion of the body, and the wearable device 3000 may identify external devices located near the wearable device 3000. For example, the first external device 4100 may be a laptop computer. The server 2000 transmits the user authentication information and the information about the task T2 to the first external device 4100 in operation S1032.

The first external device 4100 provides the content providing server 5000 with the user authentication information received from the server 2000, and requests from the content providing server 5000 the details of the email stored in the content providing server 5000 in operation S1042. The content providing server 5000 analyzes the user authentication information and provides the first external device 4100 with the details of the email that was stored while being written, in operation S1052.

According to an embodiment of the present disclosure, when the device 1000 performs the task T2 of writing an email, the device 1000 transmits user authentication information and information about the task T2 to the server 2000, and the server 2000 determines the first external device 4100 as an external device suitable to continuously write the email, and the first external device 4100 may continuously perform the task T2.

Referring to FIG. 10C, the device 1000 may perform a task T3 of playing a game. When performing the task T3, the device 1000 may receive content of the game from a service providing server 5100. According to an embodiment of the present disclosure, the device 1000 may transmit user authentication information so that content may be downloaded from the service providing server 5100, to the service providing server 5100, and request the content of the game in S1004. The service providing server 5100 may analyze the user authentication information received from the device 1000, and provides the device 1000 with the content of the game based on the user authentication information in operation S1014. The device 1000 transmits the user authentication information and the information about the task T3 to the server 2000 in operation S1024. The information about the task T3 may include, for example, a capacity of the game, a resolution of the game, and a progress level of the game.

According to an embodiment of the present disclosure, when a user of the device 1000 enters home from the outside, the server 2000 identifies external devices around the user, and analyzes characteristics of identified devices and the information of the task T3 so as to select the third external device 4300 that is suitable to continuously play the game. According to an embodiment of the present disclosure, the user of the device 1000 may be wearing the wearable device 3000 (e.g., see FIG. 8) on a portion of the body, and the wearable device 3000 may identify external devices located near the wearable device 3000. For example, the third external device 4300 may be a tablet PC. The server 2000 transmits the user authentication information and the information about the task T3 to the third external device 4300 in operation S1034.

The third external device 4300 provides the service providing server 5100 with the user authentication information received from the server 2000, and requests from the service providing server 5100 the content of the game in operation S1044. The service providing server 5100 analyzes the user authentication information so as to provide the third external device 4300 with the requested content of the game in operation S1054.

According to an embodiment of the present disclosure, when the device 1000 performs the task T3 of executing a game, the device 1000 transmits user authentication information and information about the task T3 to the server 2000, and the server 2000 determines the third external device 4300 as an external device suitable to continuously play the game, and the third external device 4300 may continuously perform the task T3. For example, the third external device 4300 may continuously play the game from a level at which the game was being played in the device 1000.

FIG. 11 is a flowchart of a method of providing an external device 4000 with information about a task performed by using a device 1000 according to an embodiment of the present disclosure.

Referring to FIG. 11, in operation S1100, the device 1000 stores information about a task performed by using the device 1000. The device 1000 may perform a task of, for example, playing a moving picture, playing music, writing an email, drafting a document, receiving weather information, displaying news information, executing a game, or taking a picture. The information about the task may include, for example, a type of the task, a type of a service provided via the task, a type of an application operated to perform the task, identification information of the device 1000, performance information of the device 1000, authentication information of the user of the task, and a type of content included in the task. The device 1000 may store the information about the task in a log storing unit.

In operations S1110 and S1115, the wearable device 3000 transmits a short range wireless communication signal to each of a plurality of external devices 4000. The short range wireless communication signal may include user authentication information. The user authentication information may include information whereby a user of the wearable device 3000 is identifiable. The wearable device 3000 may identify the plurality of wearable devices 4000 located near the wearable device 3000. For example, when the first external device 4100 is a common use device, the first external device 4100 may receive the user authentication information so as to be in a state able to receive the information about a task of the user of the wearable device 3000.

The short range wireless communication signal may include, for example, a beacon, NFC, ZigBee communication, RFID communication, UWB communication, and Bluetooth communication, but is not limited thereto. According to an embodiment of the present disclosure, the wearable device 3000 may transmit a beacon signal (e.g., a beacon message) to each of the first external device 4100 and the second external device 4200.

In operation S1120 and S1125, the plurality of external devices 4000 transmit the user authentication information received from the wearable device 3000 and an information value about a distance between each of the plurality of external devices 4000 and the wearable device 3000 to the device 1000. The device 1000 may identify the plurality of external devices 4000 located near the wearable device 3000 based on the received information value of the distance between each of the plurality of external devices 4000 and the wearable device 3000. Also, the device 1000 may identify the plurality of external devices 4000 based on the user authentication information. For example, if the first external device 4100 is a common use device, the user authentication information is input in operation S1110, and the user authentication information is transmitted to the device 1000 in operation S1120 so that the first external device 4100 is in a state able to receive information about a task from the device 1000.

According to an embodiment of the present disclosure, the first external device 4100 may transmit an information value about a distance between the wearable device 3000 and the first external device 4100 to the device 1000. Likewise, the second external device 4200 may transmit an information value about a distance between the wearable device 3000 and the second external device 4200 to the device 1000. According to an embodiment of the present disclosure, the first external device 4100 and the second external device 4200 may transmit the information value about the distance in a wireless manner. For example, the first external device 4100 and the second external device 4200 may transmit the information value about the distance to the device 1000 via at least one of Wi-Fi, data communication via a cellular network, a beacon, NFC, ZigBee communication, RFID communication, UWB communication, and Bluetooth communication.

In operation S1130, the device 1000 receives the user authentication information and the information value about the distance with respect to the wearable device 3000 from each of the plurality of external devices 4000 to thereby authenticate the plurality of external devices 4000. According to an embodiment of the present disclosure, the device 1000 may identify a plurality of external devices 4000 located near the wearable device 3000 based on the information value about the distance between each of the plurality of external devices 4000 and the wearable device received in operations S1120 and S1125. Also, the device 1000 may authenticate the plurality of external devices 4000 based on the user authentication information received in operations S1120 and S1125. The authentication may be a criterion for the device 1000 when selecting an external device to which information about a task that was being performed by using the device 1000 is to be transmitted.

In operation S1140, the device 1000 determines an external device suitable to continuously perform the task that the device 100 was performing. According to an embodiment of the present disclosure, the device 1000 may analyze the information about the task and characteristics information of the identified external devices so as to determine an external device suitable to continuously perform the task from among the plurality of identified external devices 4000. According to an embodiment of the present disclosure, the device 1000 may determine the first external device 4100 as an external device that is suitable to continuously perform the task.

In operation S1150, the device 1000 transmits the information about the task that was being performed by using the device 1000 to the first external device 4100.

In operation S1160, the first external device 4100 continuously performs the task based on the information about the task received from the device 1000. The first external device 4100 may continuously perform the task that was being performed by using the device 1000.

Figure 12:
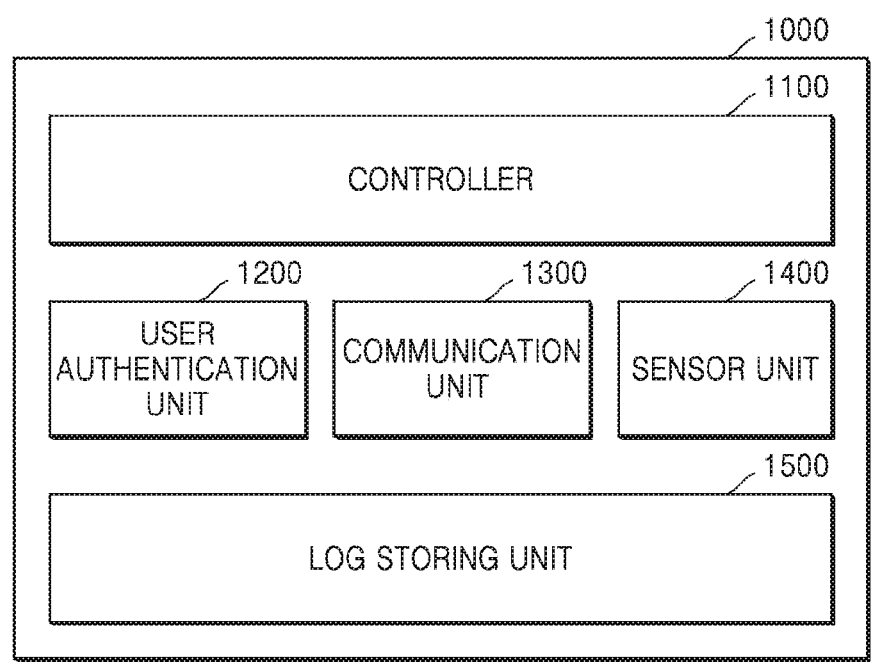
FIG. 12 is a block diagram illustrating a device according to an embodiment of the present disclosure.

FIG. 12 is a block diagram illustrating a device 1000 according to an embodiment of the present disclosure.

Referring to FIG. 12, the device 1000 may include a controller 1100, a user authentication unit 1200, a communication unit 1300, a sensor unit 1400, and a log storing unit 1500. According to an embodiment of the present disclosure, the device 1000 may further include an input/output unit, a camera unit, a GPS receiver, or the like.

The controller 1100 typically controls an overall operation of the device 1000. For example, the controller 1100 may execute programs stored in the controller 1100 to thereby control the user authentication unit 1200, the communication unit 1300, the sensor unit 1400, the log storing unit 1500 or the like overall. According to an embodiment of the present disclosure, the controller 1100 may perform a task of executing an application such as playing a moving picture, playing music, writing an email, executing a game, or receiving news information. The controller 1100 may store device identification information or a model number of the device 1000 or information about characteristics of the device 1000 or the like. Also, the controller 1100 may transmit information about a task that is being performed by using the device 1000 to the server 2000 (see FIG. 1) via the communication unit 1300. According to an embodiment of the present disclosure, the controller 1100 may identify a plurality of external devices 4000 (see FIG. 11) located near the device 1000, and may determine an external device that is suitable to continuously perform the task that was being performed by using the device 1000 from among the identified external devices.

The user authentication unit 1200 may store authentication information of a user who is using the device 1000. The user authentication information may be authentication information used to provide information about a task performed by using the device 1000 to the plurality of external devices 4000 (see FIG. 1). According to an embodiment of the present disclosure, the user authentication unit 1200 may store user authentication information to request from the content providing server 5000 (see FIG. 8) content to be used to perform a task.

The communication unit 1300 may perform data communication with the server 2000 (see FIG. 1) or a cellular network base station via a wireless communication method such as Wi-Fi, Bluetooth, BLE, NFC, RFID, and data communication via a cellular network or via a wired communication method using an optical cable, a UTP cable, or a coaxial cable or the like.

The sensor unit 1400 may include a gravity sensor sensing motion of the device 1000, an illuminance sensor sensing luminance of light, a motion sensor sensing motion of the device 1000 or the like. According to an embodiment of the present disclosure, the sensor unit 1400 may include a proximity sensor that identifies an external device located near the device 1000.

The log storing unit 1500 may include information about a type of a task performed by using the device 1000 or a performance history of the task or the like. The log storing unit 1500 may store log information including, for example, the number of times of performing a task, a type of a task performed according to a device type, a type of a service received while performing a task, a type of an application used to perform a task, or URL information for receiving content when a task for receiving the content is performed.

Figure 13:
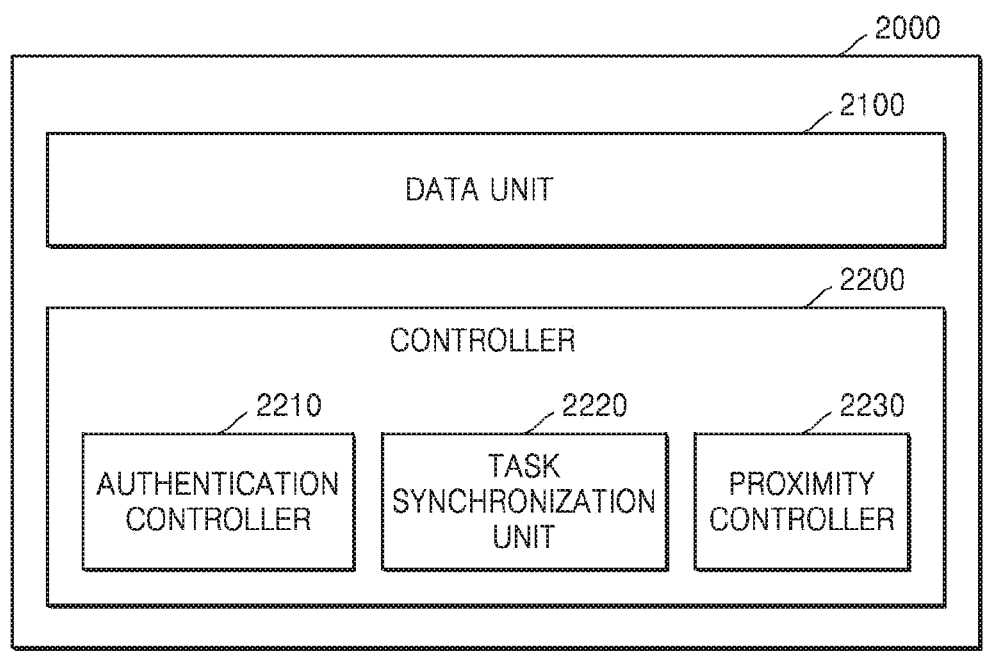
FIG. 13 is a block diagram illustrating a server according to an embodiment of the present disclosure.

FIG. 13 is a block diagram illustrating a server 2000 according to an embodiment of the present disclosure.

Referring to FIG. 13, the server 2000 may include a data unit 2100 and a controller 2200.

The data unit 2100 may store data such as information about a task performed by using the device 1000 (see FIG. 1) or the plurality of external devices 4000 (see FIG. 1), identification information of the device 1000 or each of the plurality of external devices 4000 or the like. According to an embodiment of the present disclosure, the data unit 2100 may store device identification information of the device 1000 such as an SSID or a model number. In addition, the data unit 2100 may store information about a task performed by using the device 1000 such as a type of a task, a type of a service received while performing a task, a type of an application operated to perform a task, authentication information of a user of a task, a type of content included in a task, capacity information of content, resolution information of content, URL information for receiving content, and information about an input device used to perform a task.

The controller 2200 may include an authentication controller 2210, a task synchronization unit 2220, and a proximity controller 2230. The controller 2200 typically controls an overall operation of the server 2000. For example, the controller 2200 may control the authentication controller 2210, the task synchronization unit 2220, the proximity controller 2230 or the like by executing programs included in the data unit 2100. Also, the controller 2200 may execute functions described with reference to FIGS. 10A through 10C to thereby transmit information about a task that was being performed by using the device 1000 (see FIG. 1) to the external device 4000 (see FIG. 1) so that the task is continuously performed by using the plurality of external devices 4000.

The authentication controller 2210 may receive and store user authentication information of the user of the device 1000. Also, the authentication controller 2210 may transmit the received user authentication information to the plurality of external devices 4000. The authentication controller 2210 may receive from the device 1000 authentication information used for the user of the device 1000 to download content via the content providing server 5000 (see FIG. 8), for example, an ID and password information registered to the content providing server 5000, and transmit the same to the plurality of external devices 4000.

The task synchronization unit 2220 may analyze a pattern for performing task of a user based on a type of a task performed by using the device 1000, characteristics of each of the plurality of external devices 4000, and information about a performance history of the task performed using the plurality of external devices 4000, and may provide an external device with information about the task that was being performed by using the device 1000. The task synchronization unit 2220 may transmit the information about the task performed by using the device 1000 to the external device so as to synchronize the task with the external device so that the task that was being performed by using the device 1000 is continuously performed by using the external device.

The proximity controller 2230 may receive information about a distance between the wearable device 3000 and the wearable device 3000, wherein the information is transmitted by the plurality of external devices 4000 that have received a short range wireless communication signal from the wearable device 3000 (see FIG. 1). The proximity controller 2230 may receive the information about the distance and identify the plurality of external devices 4000 located near the wearable device 3000.

Figure 14:
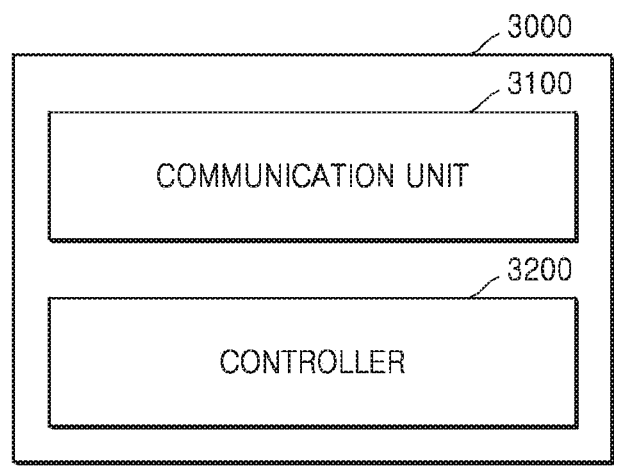
FIG. 14 is a block diagram illustrating a wearable device according to an embodiment of the present disclosure.

FIG. 14 is a block diagram illustrating a wearable device 3000 according to an embodiment of the present disclosure.

Referring to FIG. 14, the wearable device 3000 may include a communication unit 3100 and a controller 3200. According to an embodiment of the present disclosure, the wearable device 3000 may further include a memory unit, a display unit, and a sensor unit.

The communication unit 3100 may include, for example, a beacon communication module, an NFC communication module, a ZigBee communication module, a Bluetooth communication module, or a mobile communication module. The communication unit 310 may transmit a short range wireless communication signal to the plurality of external devices 4000 (see FIG. 1) located near the wearable device 3000. According to an embodiment of the present disclosure, the short range wireless communication signal may include a beacon, NFC, ZigBee communication, RFID communication, UWB communication, and Bluetooth communication.

The controller 3200 typically controls an overall operation of the wearable device 3000. The controller 3200 may include a data unit that stores user authentication information whereby a user of the wearable device 3000 is identifiable.

Figure 15:
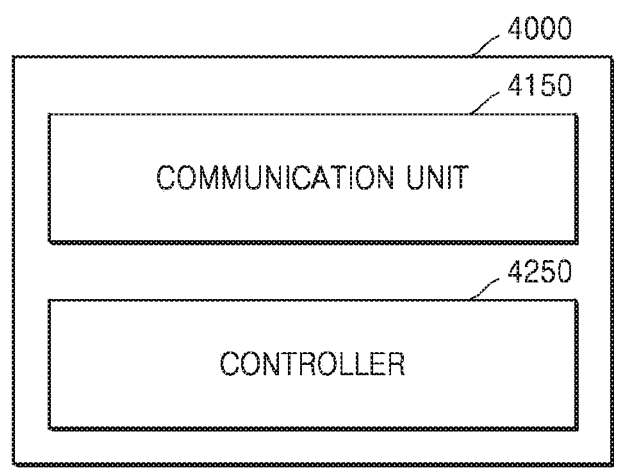
FIG. 15 is a block diagram illustrating an external device according to an embodiment of the present disclosure.

FIG. 15 is a block diagram illustrating an external device 4000 according to an embodiment of the present disclosure.

Referring to FIG. 15, the external device 4000 may include a communication unit 4150 and a controller 4250.

The communication unit 4150 may receive from the wearable device 3000 a short range wireless communication signal for identifying the external device 4000 located near the wearable device 3000 and may transmit to the server 2000 an information value about a distance between the device 4000 and the wearable device 3000. According to an embodiment of the present disclosure, the communication unit 4150 may transmit device identification information of the external device 4000 to the server 2000. The device identification information may include information such as an SSID or a model number. The communication unit 4150 may receive information about a task that was being performed by using the device 1000.

The controller 4250 typically controls an overall operation of the external device 4000. According to an embodiment of the present disclosure, the controller 4250 may analyze the information about the task received by the communication unit 4150 to thereby continuously perform the task that was being performed by using the device 1000.

An embodiment of the present disclosure may also be realized in a form of a recording medium having recorded thereon commands executable by a computer, such as a program module executed by a computer. A non-transitory computer-readable recording medium may be an arbitrary available medium accessible by a computer, and may be any one of volatile, nonvolatile, separable, and non-separable media. Also, examples of the non-transitory computer-readable recording medium may include a computer storage medium and a communication medium. Examples of the computer storage medium include volatile, nonvolatile, separable, and non-separable media realized by an arbitrary method or technology for storing information about a computer-readable command, a data structure, a program module, or other data. The communication medium may include a computer-readable command, a data structure, a program module, other data of a modulated data signal, such as carrier waves, or other transmission mechanisms, and may be an arbitrary information transmission medium.

While the present disclosure has been particularly shown and described with reference to embodiments thereof, it will be understood by those of ordinary skill in the art that various changes in form and details may be made therein without departing from the spirit and scope of the present disclosure as defined by the appended claims. The various embodiments should be considered in a descriptive sense only and not for purposes of limitation. For example, each element described as a single type may be distributed, and similarly, elements described to be distributed may be combined.

It should be understood that various embodiments described herein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of receiving, by an external device, information about a task being performed by a user device, the method comprising:
receiving, from a wearable device, a first short range wireless communication signal;
transmitting, by the external device to a server, information associated with a location of the wearable device in response to receiving the first short range communication signal from the wearable device;
receiving, from the server, information about the task being performed by the user device in response to the external device being selected to perform the task based on the information associated with the location of the wearable device transmitted from the external device; and
performing, by the external device, the task in response to receiving the information about the task from the server.

2. The method of claim 1, further comprising:
determining, by the external device, a distance between the external device and the wearable device based on the first short range wireless communication signal received from the wearable device,
wherein the information associated with the location of the wearable device includes information associated with the distance determined between the external device and the wearable device, and
wherein the external device is selected from a plurality of external devices located near the wearable device based on the information associated with the location associated with the distance determined between the external device and the wearable device.

3. The method of claim 2, wherein the information associated with the distance determined between the external device and the wearable device is transmitted from the external device via a wireless communication signal that is different from the first short range wireless communication signal.

4. The method of claim 2, further comprising:
transmitting, from the external device to the wearable device, a second short range communication signal,
wherein a distance between the external device and the wearable device is determined based on the information associated with the location of the wearable device and information associated with the second short range communication signal.

5. The method of claim 1, wherein the information associated with the location of the wearable device further comprises device identification information associated with the external device.

6. The method of claim 1, wherein the information associated with the location of the wearable device further comprises an indication that the external device is in an active status for receiving the information associated with the task and for performing a function related to the task.

7. The method of claim 1, wherein the first short range wireless communication signal comprises authentication information for identifying a user associated with the user device.

8. The method of claim 1, wherein the information about the task performed by the user device comprises information about a type of a task performed by the user device and history information about one or more external devices that have performed the task.

9. The method of claim 1, further comprising:
transmitting, by the external device to the server, device identification information and history information associated with the task.

10. The method of claim 9, wherein the history information comprises a pattern of performing the task by one or more users.

11. The method of claim 1, wherein the performing of the task comprises:
receiving user authentication information needed to receive content related to the task from a content providing server;
receiving the content from the content providing server by using the user authentication information; and
executing the content.

12. A non-transitory computer readable recording medium having embodied thereon a program for executing on a computer the method of claim 1.

13. The method of claim 1, wherein the external device comprises at least one of a television (TV), a tablet PC, a laptop computer, an illumination, a refrigerator, audio equipment, a washing machine, an oven, a gas range, a home gateway, a game player, an electronic blackboard, or a touch tab.

14. An external device for receiving information about a task being performed by a user device, comprising:
a communication interface configured to transmit and receive information;
a memory configured to store instructions therein; and
at least one processor,
wherein, upon execution of the instructions, the at least one processor is configured to:
receive, from a wearable device via the communication interface, a first short range wireless communication signal,
transmit, to a server via the communication interface, information associated with a location of the wearable device in response to receiving the first short range wireless communication signal from the wearable device,
receive, from the server via the communication interface, the information about the task being performed by the user device in response to the external device being selected to perform the task based on the information associated with the location of the wearable device transmitted from the external device, and
perform the task in response to receiving the information about the task from the server.

15. The external device of claim 14,
wherein the wearable device is configured to be worn and used by a user of the user device, and
wherein the wearable device identifies the external device from a plurality of external devices located near the wearable device.

16. The external device of claim 15, wherein the communication interface comprises:
a long range wireless communication transceiver; and
a short range wireless communication transceiver.

17. The external device of claim 16, wherein the at least one processor is further configured to:
determine a distance between the external device and the wearable device based on the first short range wireless communication signal received from the wearable device,
wherein the information associated with the location of the wearable device includes information associated with the distance determined between the external device and the wearable device.

18. The external device of claim 14,
wherein the external device is selected from a plurality of external devices based on a task performing pattern associated with a user of the user device, and
wherein the task performing pattern associated with the user is based on a type of the task and history information about one or more of the plurality of external devices that performed the task.

19. The external device of claim 18,
wherein the history information about one or more of the plurality of external devices that performed the task comprises a pattern of performing the task by one or more users, and
wherein the at least one processor is further configured to continuously perform the task included in the information about the task such that the external device resumes performing the task at a point in which the user device discontinued performing the task.

20. A method of receiving, by an external device, information about a task being performed by a user device, the method comprising:
receiving, from a wearable device, a short range wireless communication signal;
transmitting, from the external device to the user device, information associated with a location of the wearable device in response to receiving the first short range communication signal from the wearable device;
receiving, from the user device, information about the task being performed by the user device in response to the external device being selected to perform the task based on the information associated with the location of the wearable device transmitted from the external device; and
performing, by the external device, the task in response to receiving the information about the task from the user device.

* * * * *